(12) United States Patent
Gomi et al.

(10) Patent No.: US 10,688,659 B2
(45) Date of Patent: Jun. 23, 2020

(54) ROBOT

(71) Applicant: Seiko Epson Corporation, Tokyo (JP)

(72) Inventors: Akihiro Gomi, Fujimi (JP); Masaki Motoyoshi, Shiojiri (JP); Akio Niu, Matsumoto (JP)

(73) Assignee: Seiko Epson Corporation (JP)

(*) Notice: Subject to any disclaimer, the term of this patent is extended or adjusted under 35 U.S.C. 154(b) by 248 days.

(21) Appl. No.: 15/810,711

(22) Filed: Nov. 13, 2017

(65) Prior Publication Data

US 2018/0065251 A1 Mar. 8, 2018

Related U.S. Application Data

(63) Continuation of application No. 14/971,071, filed on Dec. 16, 2015, now Pat. No. 9,844,875, which is a
(Continued)

(30) Foreign Application Priority Data

Aug. 31, 2012 (JP) .................................. 2012-191450

(51) Int. Cl.
*B25J 9/16* (2006.01)
*B25J 18/00* (2006.01)

(52) U.S. Cl.
CPC .......... *B25J 9/1651* (2013.01); *B25J 9/1638* (2013.01); *B25J 9/1694* (2013.01); *B25J 18/00* (2013.01);
(Continued)

(58) Field of Classification Search
None
See application file for complete search history.

(56) References Cited

U.S. PATENT DOCUMENTS 4,882,527 A 11/1989 Yakuyama et al.
5,086,401 A 2/1992 Glassman et al.
(Continued)

FOREIGN PATENT DOCUMENTS

EP 1803536 A1 7/2007
EP 2492064 A2 8/2012
(Continued)

OTHER PUBLICATIONS

Extended European Search Report for European Patent Application No. 13182169.6 dated Jul. 15, 2015 (7 pages).

*Primary Examiner* — Bhavesh V Amin
(74) *Attorney, Agent, or Firm* — Harness, Dickey & Pierce, P.L.C.

(57) ABSTRACT

A robot includes a base, a first arm that rotates around a first rotation axis, a second arm that rotates around a second rotation axis extending in a direction different than the first rotation axis, a third arm that rotates around a third rotation axis extending in a direction parallel to the second rotation axis, a first inertia sensor at the first arm, a second (a) inertia sensor at the third arm, a first angle sensor at a first drive source, a third angle sensor at a third drive source, and the drive sources rotate the respective arms. Angular velocities from the first inertia sensor and the first angle sensor are fed back to a first drive source control unit. Angular velocities from the second (a) inertia sensor and the third angle sensor are fed back to a second drive source control unit.

20 Claims, 14 Drawing Sheets

Related U.S. Application Data continuation of application No. 14/015,158, filed on Aug. 30, 2013, now Pat. No. 9,242,377.

(52) U.S. Cl.
CPC .............. *G05B 2219/39195* (2013.01); *G05B 2219/39335* (2013.01); *G05B 2219/40597* (2013.01); *Y10S 901/02* (2013.01); *Y10S 901/09* (2013.01); *Y10S 901/27* (2013.01); *Y10S 901/46* (2013.01); *Y10T 74/20329* (2015.01)

(56) References Cited

U.S. PATENT DOCUMENTS

| | | | |
|---|---|---|---|
| 6,216,056 B1* | 4/2001 | Ito | B25J 9/16 700/157 |
| 7,233,872 B2 | 6/2007 | Shibasaki et al. | |
| 7,765,023 B2 | 7/2010 | Oaki et al. | |
| 8,160,205 B2* | 4/2012 | Saracen | A61B 6/0457 378/35 |
| 8,452,449 B2* | 5/2013 | Iida | B25J 9/1638 156/750 |
| 8,463,440 B2* | 6/2013 | Motoyoshi | B25J 9/1638 318/568.18 |
| 9,037,293 B2* | 5/2015 | Gomi | B25J 9/1638 623/24 |
| 9,242,377 B2* | 1/2016 | Gomi | B25J 9/1638 |
| 9,298,179 B2* | 3/2016 | Toshimitsu | G05B 19/404 |
| 9,302,388 B2* | 4/2016 | Gomi | B25J 9/1651 |
| 9,844,875 B2* | 12/2017 | Gomi | B25J 9/1638 |
| 10,399,222 B2* | 9/2019 | Gomi | B25J 9/1651 |
| 2003/0178964 A1* | 9/2003 | Challoner | B25J 9/1694 318/568.21 |
| 2005/0234327 A1* | 10/2005 | Saracen | A61B 6/0457 600/407 |
| 2005/0246061 A1* | 11/2005 | Oaki | B25J 9/1692 700/245 |
| 2007/0288124 A1* | 12/2007 | Nagata | B25J 9/1694 700/258 |
| 2009/0003975 A1 | 1/2009 | Kuduvalli et al. | |
| 2009/0037022 A1 | 2/2009 | Teaford et al. | |
| 2010/0318223 A1* | 12/2010 | Motoyoshi | B25J 9/1638 700/253 |
| 2011/0004343 A1* | 1/2011 | Iida | B25J 9/1638 700/253 |
| 2012/0035763 A1 | 2/2012 | Motoyoshi | |
| 2012/0048027 A1 | 3/2012 | Hashiguchi et al. | |
| 2012/0179294 A1 | 7/2012 | Sasai | |
| 2012/0215356 A1 | 8/2012 | Igarashi et al. | |
| 2012/0215357 A1 | 8/2012 | Igarashi et al. | |
| 2014/0060233 A1* | 3/2014 | Gomi | B25J 9/1638 74/490.05 |
| 2014/0067118 A1* | 3/2014 | Gomi | B25J 9/1651 700/253 |
| 2014/0067119 A1* | 3/2014 | Gomi | B25J 9/1651 700/253 |
| 2014/0067120 A1* | 3/2014 | Gomi | B25J 9/1638 700/254 |
| 2014/0121837 A1 | 5/2014 | Hashiguchi et al. | |
| 2014/0214204 A1* | 7/2014 | Toshimitsu | B25J 9/1638 700/253 |
| 2015/0190928 A1 | 7/2015 | Motoyoshi | |
| 2016/0101521 A1* | 4/2016 | Gomi | B25J 9/1638 74/490.01 |
| 2016/0107311 A1* | 4/2016 | Niu | B25J 13/088 700/254 |
| 2016/0151914 A1* | 6/2016 | Asada | B25J 13/088 700/254 |
| 2018/0065251 A1* | 3/2018 | Gomi | B25J 9/1651 |
| 2018/0147724 A1* | 5/2018 | Oaki | B25J 9/1638 |

FOREIGN PATENT DOCUMENTS

| | | |
|---|---|---|
| JP | 60-020214 A | 2/1985 |
| JP | 01-103279 A | 4/1989 |
| JP | 10-100085 | 4/1998 |
| JP | 2005-242794 A | 9/2005 |
| JP | 2011-042022 A | 3/2011 |
| JP | 2011-136395 A | 7/2011 |
| JP | 2012-035361 A | 2/2012 |
| JP | 2012-139770 A | 7/2012 |
| JP | 2012-171051 A | 9/2012 |
| JP | 2012-171052 A | 9/2012 |
| WO | WO-2006-022201 A1 | 3/2006 |

* cited by examiner

ROBOT

CROSS-REFERENCE TO RELATED APPLICATIONS

This is a continuation patent application of U.S. application Ser. No. 14/971,071 filed Dec. 16, 2015, which is a continuation patent application of U.S. application Ser. No. 14/015,158 filed Aug. 30, 2013, now U.S. Pat. No. 9,242,377 issued Jan. 26, 2016, which claims priority to Japanese Patent Application No. 2012-191450 filed Aug. 31, 2012, all of which are expressly incorporated by reference herein in their entireties.

BACKGROUND

1. Technical Field

The present invention relates to a robot.

2. Related Art

In the related art, a robot having a base and a plurality of arm link portions is known (for example, refer to JP-A-10-100085). Each arm link portion is rotatably coupled to an adjacent arm link portion on a base end side via a joint portion, and the arm link portion closest to the base side is rotatably coupled to the base via another joint portion.

In such a robot, the rigidity of the joint portion that couples the base and the arm link portion or the rigidity of the joint portion that couples the arm link portions together is low as compared to the base or the arm link portions that are biased by the spring elements of the joint portions. As such, a vibration may be easily generated in the arm link portions due to the rotation of the arm link portions or a disturbance applied to the arm link portions.

Thus, in the robot described in JP-A-10-100085, an acceleration sensor is installed at a tip portion of the arm link portion closest to a tip side of the robot, compensation components of the respective joint portions that compensate command values to the motors of the respective joint portions so as to suppress the vibration generated at the tip portion of the arm link portion closest to the tip side are calculated on the basis of the acceleration detected by the acceleration sensor, and the calculated compensation components of the respective joint portions are subtracted from the command values of the corresponding respective joint portions.

However, the robot described in JP-A-10-100085 has the following problems.

Since the acceleration sensor is installed at the tip portion of the arm link portion closest to the tip side, the acceleration detected by the acceleration sensor is converted and corrected for the respective joint portions. At this time, since it is necessary to perform a coordinate axis transformation referred to as the Jacobi's transformation, and a matrix calculation having a number of sine and cosine factors is required, the amount of calculations becomes huge. Since it is necessary to calculate the factors according to the rotation angles of the motors of the respective joint portions that change every moment, it is always necessary to execute huge calculations. Accordingly, there is a drawback in that the response speed becomes slow.

Additionally, since accurate acceleration or speed cannot be fed back if the calculation precision declines, the vibration suppression capability may decline or control performance may be impaired. For this reason, there is a restriction on the design of a control system in that a high-speed computing unit is required, for example.

Additionally, in the calculation of the coordinate axis transformation, there is a region (an incalculable region) with no coordinate axis transformation solution referred to as a singular point. In this region, the vibration suppression capability may decline or the vibration may be increased instead.

SUMMARY

An advantage of some aspects of the disclosure is to provide a robot that can easily and reliably suppress the vibration in the robot even if the number of sensors to be used is reduced.

Application Example 1

This application example is directed to a robot including a base; a first arm that is coupled to the base and rotates with a first rotation axis as an axial center; a second arm that is coupled to the first arm and rotates with a second rotation axis in a direction different from the first rotation axis as an axial center; a third arm that rotates with a third rotation axis in a direction parallel to the second rotation axis as an axial center; a first drive source that rotates the first arm through a first angular velocity command; a first inertia sensor that is installed at the first arm and detects the angular velocity or acceleration of the first arm around the first rotation axis; a first angle sensor that detects the rotation angle of the first drive source; a second drive source that rotates the second arm through a second angular velocity command; a second angle sensor that detects the rotation angle of the second drive source; a third drive source that rotates the third arm; a second (a) inertia sensor that is installed at the third arm and detects the angular velocity or acceleration of the third arm around the second rotation axis; a third angle sensor that detects the rotation angle of the third drive source; a first drive source control unit that feeds back a first correction component, which is derived from an angular velocity $\omega A1$ of the first arm around the first rotation axis obtained from the first inertia sensor and an angular velocity $\omega A1m$ of the first arm around the first rotation axis obtained from the first angle sensor, and controls the first drive source; and a second drive source control unit that feeds back a second correction component, which is derived from an angular velocity $\omega A3$ of the third arm around the second rotation axis obtained from the second (a) inertia sensor, an angular velocity $\omega A2m$ of the second arm around the second rotation axis obtained from the second angle sensor, and an angular velocity $\omega A3m$ of the third arm around the third rotation axis obtained from the third angle sensor, and controls the second drive source.

In the application example, even if the number of sensors to be used is reduced, the vibration in the robot can be easily and reliably suppressed. The direction of the second rotation axis and the direction of the third rotation axis are made parallel to each other, and the feedback of the control of the drive sources is performed by one inertia sensor that detects an angular velocity in the direction of the rotation axes. That is, the control of the second drive source is fed back by an angular velocity detected by the second (a) inertia sensor.

Accordingly, a huge calculation is unnecessary, and the response speed in the control of the robot can be increased. Additionally, since a calculation in which a singular point is present is unnecessary, the control of the robot can be reliably performed, and the vibration can be reliably suppressed.

Additionally, compared to a case where the inertia sensors are installed at the respective arms and the control of suppressing the vibration in each arm is performed on each arm, the number of the inertia sensors can be reduced, costs can be reduced, and the circuit configuration can be simplified.

Particularly, in the second drive source control unit, the second correction component derived from the angular velocity $\omega A3$, the angular velocity $\omega A2m$, and the angular velocity $\omega A3m$ is fed back and controlled. That is, since the control of suppressing vibration is performed on the second drive source that rotates the second arm, using the detection result of the second (a) inertia sensor installed at the third arm on the tip side where a larger vibration than the second arm is generated, the effect of suppressing the vibration can be enhanced. Additionally, the effect of suppressing the vibration can be enhanced by controlling the operation of the second drive source that rotates the second arm closer to the base end side than the third arm.

Application Example 2

In the robot of the application example, it is preferable that the robot further includes the first drive source control unit that feeds back the first angular velocity command by the first correction component obtained by multiplying a value, which is obtained by subtracting the angular velocity $\omega A1m$ from the angular velocity $\omega A1$, by a feedback gain; and the second drive source control unit that feeds back the second angular velocity command by the second correction component obtained by multiplying a value, which is obtained by subtracting the angular velocity $\omega A2m$ and the angular velocity $\omega A3m$ from the angular velocity $\omega A3$, by a feedback gain.

Since the feedback control of correcting the angular velocity commands by the correction components obtained by multiplying feedback gains suitable for the respective control units is performed on the first drive source control unit and the second drive source control unit that have different rotation axis directions, the vibration in the robot can be more reliably suppressed.

Application Example 3

This application example is directed to a robot including a base; a first arm that is coupled to the base and rotates with a first rotation axis as an axial center; a second arm that is coupled to the first arm and rotates with a second rotation axis in a direction different from the first rotation axis as an axial center; a third arm that rotates with a third rotation axis in a direction parallel to the second rotation axis as an axial center; a first drive source that rotates the first arm through a first angular velocity command; a first inertia sensor that is installed at the first arm and detects the angular velocity or acceleration of the first arm around the first rotation axis; a first angle sensor that detects the rotation angle of the first drive source; a second drive source that rotates the second arm; a second angle sensor that detects the rotation angle of the second drive source; a third drive source that rotates the third arm through a third angular velocity command; a second (a) inertia sensor that is installed at the third arm and detects the angular velocity or acceleration of the third arm around the second rotation axis; a third angle sensor that detects the rotation angle of the third drive source, a first drive source control unit that feeds back a first correction component, which is derived from an angular velocity $\omega A1$ of the first arm around the first rotation axis obtained from the first inertia sensor and an angular velocity $\omega A1m$ of the first arm around the first rotation axis obtained from the first angle sensor, and controls the first drive source; and a third drive source control unit that feeds back a third correction component, which is derived from an angular velocity $\omega A3$ of the third arm around the second rotation axis obtained from the second (a) inertia sensor, an angular velocity $\omega A2m$ of the second arm around the second rotation axis obtained from the second angle sensor, and an angular velocity $\omega A3m$ of the third arm around the third rotation axis obtained from the third angle sensor, and controls the third drive source.

In this application example, even if the number of the sensors to be used is reduced, the vibration in the robot can be easily and reliably suppressed. The direction of the second rotation axis and the direction of the third rotation axis are made parallel to each other, and the feedback of the control of the drive sources is performed by one inertia sensor that detects an angular velocity in the direction of the rotation axes. That is, the control of the third drive source is fed back by an angular velocity detected by the second (a) inertia sensor.

Accordingly, a huge calculation is unnecessary, and the response speed in the control of the robot can be increased. Additionally, since a calculation in which a singular point is present is unnecessary, the control of the robot can be reliably performed, and the vibration can be reliably suppressed.

Additionally, compared to a case where the inertia sensors are installed at the respective arms and the control of suppressing the vibration in each arm is performed on each arm, the number of the inertia sensors can be reduced, costs can be reduced, and the circuit configuration can be simplified.

Particularly, in the third drive source control unit, the third correction component derived from the angular velocity $\omega A3$, the angular velocity $\omega A2m$, and the angular velocity $\omega A3m$ is fed back and controlled. That is, since the control of suppressing vibration is performed on the third drive source that rotates the third arm, using the detection result of the second (a) inertia sensor installed at the third arm on the tip side where a larger vibration than the second arm is generated, the effect of suppressing the vibration can be enhanced.

Application Example 4

In the robot of the application example, it is preferable that the robot further includes the first drive source control unit that feeds back the first angular velocity command by the first correction component obtained by multiplying a value, which is obtained by subtracting the angular velocity $\omega A1m$ from the angular velocity $\omega A1$, by a feedback gain; and the third drive source control unit that feeds back the third angular velocity command by the third correction component obtained by multiplying a value, which is obtained by subtracting the angular velocity $\omega A2m$ and the angular velocity $\omega A3m$ from the angular velocity $\omega A3$, by a feedback gain.

Since the feedback control of correcting the angular velocity commands by the correction components obtained by multiplying feedback gains suitable for the respective control units is performed on the first drive source control unit and the third drive source control unit that have rotation axes in different directions, the vibration in the robot can be more reliably suppressed.

Application Example 5

This application example is directed to a robot including a base; a first arm that is coupled to the base and rotates with a first rotation axis as an axial center; a second arm that is coupled to the first arm and rotates with a second rotation axis in a direction different from the first rotation axis as an axial center; a third arm that rotates with a third rotation axis in a direction parallel to the second rotation axis as an axial center; a first drive source that rotates the first arm through a first angular velocity command; a first inertia sensor that is installed at the first arm and detects the angular velocity or acceleration of the first arm around the first rotation axis; a first angle sensor that detects the rotation angle of the first drive source; a second drive source that rotates the second arm through a second angular velocity command; a second (b) inertia sensor that is installed at the second arm and detects the angular velocity or acceleration of the second arm around the second rotation axis; a second angle sensor that detects the rotation angle of the second drive source; a third drive source that rotates the third arm; a first drive source control unit that feeds back a first correction component, which is derived from an angular velocity $\omega A1$ of the first arm around the first rotation axis obtained from the first inertia sensor and an angular velocity $\omega A1m$ of the first arm around the first rotation axis obtained from a detection result of the first angle sensor, and controls the first drive source; and a second drive source control unit that feeds back a second correction component, which is derived from an angular velocity $\omega A2$ of the second arm around the second rotation axis obtained from the second (b) inertia sensor, and an angular velocity $\omega A2m$ of the second arm around the second rotation axis obtained from the second angle sensor, and controls the second drive source.

In this application example, even if the number of the sensors to be used is reduced, the vibration in the robot can be easily and reliably suppressed. The direction of the second rotation axis and the direction of the third rotation axis are made parallel to each other, and the feedback of the control of the drive sources is performed by one inertia sensor that detects an angular velocity in the direction of the rotation axes. That is, the vibration control of the second drive source is fed back by an angular velocity detected by the second (b) inertia sensor.

Accordingly, a huge calculation is unnecessary, and the response speed in the control of the robot can be increased. Additionally, since a calculation in which a singular point is present is unnecessary, the control of the robot can be reliably performed, and the vibration can be reliably suppressed.

Additionally, compared to a case where the inertia sensors are installed at the respective arms and the control of suppressing the vibration in each arm is performed on each arm, the number of the inertia sensors can be reduced, costs can be reduced, and the circuit configuration can be simplified.

Additionally, the effect of suppressing the vibration can be enhanced by controlling the operation of the second drive source that rotates the second arm closer to the base end side than the third arm.

Application Example 6

In the robot of the application example, it is preferable that the robot further includes the first drive source control unit that feeds back the first angular velocity command by the first correction component obtained by multiplying a value, which is obtained by subtracting the angular velocity $\omega A1m$ from the angular velocity $\omega A1$, by a feedback gain; and the second drive source control unit that feeds back the second angular velocity command by the second correction component obtained by multiplying a value, which is obtained by subtracting the angular velocity $\omega A2m$ from the angular velocity $\omega A2$, by a feedback gain.

Since the feedback control of correcting the angular velocity commands by the correction components obtained by multiplying feedback gains suitable for the respective control units is performed on the first drive source control unit and the second drive source control unit that have rotation axes in different directions, the vibration in the robot can be more reliably suppressed.

Application Example 7

This application example is directed to a robot including a base; a first arm that is coupled to the base and rotates with a first rotation axis as an axial center; a second arm that is coupled to the first arm and rotates with a second rotation axis in a direction different from the first rotation axis as an axial center; a third arm that rotates with a third rotation axis in a direction parallel to the second rotation axis as an axial center; a first drive source that rotates the first arm through a first angular velocity command; a first inertia sensor that is installed at the first arm and detects the angular velocity or acceleration of the first arm around the first rotation axis; a first angle sensor that detects the rotation angle of the first drive source; a second drive source that rotates the second arm; a second angle sensor that detects the rotation angle of the second drive source; a second (b) inertia sensor that is installed at the second arm and detects the angular velocity or acceleration of the second arm around the second rotation axis; a third drive source that rotates the third arm through a third angular velocity command; a third angle sensor that detects the rotation angle of the third drive source; a first drive source control unit that feeds back a first correction component, which is derived from an angular velocity $\omega A1$ of the first arm around the first rotation axis obtained from the first inertia sensor and an angular velocity $\omega A1m$ of the first arm around the first rotation axis obtained from the first angle sensor, and controls the first drive source; and a third drive source control unit that feeds back a third correction component, which is derived from an angular velocity $\omega A2$ of the second arm around the second rotation axis obtained from the second (b) inertia sensor, an angular velocity $\omega A2m$ of the second arm around the second rotation axis obtained from the second angle sensor, and an angular velocity $\omega A3m$ of the third arm around the third rotation axis obtained from the third angle sensor, and controls the third drive source.

In this application example, even if the number of the sensors to be used is reduced, the vibration in the robot can be easily and reliably suppressed. The direction of the second rotation axis and the direction of the third rotation axis are made parallel to each other, and the feedback of the control of the drive sources is performed by one inertia sensor that detects an angular velocity in the direction of the rotation axes. That is, the control of the third drive source is fed back by an angular velocity detected by the second (b) inertia sensor.

Accordingly, a huge calculation is unnecessary, and thereby, the response speed in the control of the robot can be increased. Additionally, since a calculation in which a singular point is present is unnecessary, the control of the robot can be reliably performed, and the vibration can be reliably suppressed.

Additionally, compared to a case where the inertia sensors are installed at the respective arms and the control of suppressing the vibration in each arm is performed on each arm, the number of the inertia sensors can be reduced, costs can be reduced, and the circuit configuration can be simplified.

Application Example 8

In the robot of the application example, it is preferable that the robot further includes the first drive source control unit that feeds back the first angular velocity command by the first correction component obtained by multiplying a value, which is obtained by subtracting the angular velocity $\omega A1m$ from the angular velocity $\omega A1$, by a feedback gain; and the third drive source control unit that feeds back the third angular velocity command by the third correction component obtained by multiplying a value, which is obtained by subtracting the angular velocity $\omega A2m$ and the angular velocity $\omega A3m$ from the angular velocity $\omega A2$, by a feedback gain.

Since the feedback control of correcting the angular velocity commands by the correction components obtained by multiplying feedback gains suitable for the respective control units is performed on the first drive source control unit and the third drive source control unit that have rotation axes in different directions, the vibration in the robot can be more reliably suppressed.

Application Example 9

In the robot of the application example, it is preferable that the robot further includes the first arm where the first inertia sensor is installed; the third arm where the second (a) inertia sensor is installed; and the second arm where no inertia sensor is installed.

Since the number of the inertia sensors can be reduced, apparatus costs can be reduced. Additionally, the weight of the second arm can be reduced.

Application Example 10

In the robot of the application example, it is preferable that the robot further includes the first arm where the first inertia sensor is installed; the second arm where the second (b) inertia sensor is installed; and the third arm where no inertia sensor is installed.

Since the number of the inertia sensors can be reduced, apparatus costs can be reduced. Additionally, the weight of the third arm can be reduced.

Application Example 11

In the robot of the application example, it is preferable that the first inertia sensor is installed at a tip portion of the first arm, and the second (a) inertia sensor is installed at a tip portion of the third arm.

Accordingly, since the first inertia sensor detects the angular velocity or acceleration of the first arm in a region where the vibration in the first arm is maximum and the second (a) inertia sensor detects the angular velocity or acceleration of the third arm in a region where the vibration in the third arm is maximum, the vibration in the robot can be more reliably suppressed.

Application Example 12

In the robot of the application example, it is preferable that the first inertia sensor is installed at a tip portion of the first arm, and the second (b) inertia sensor is installed at a tip portion of the second arm.

Accordingly, since the first inertia sensor detects the angular velocity or acceleration of the first arm in a region where the vibration in the first arm is maximum and the second (b) inertia sensor detects the angular velocity or acceleration of the second arm in a region where the vibration in the second arm is maximum, the vibration in the robot can be more reliably suppressed.

Application Example 13

In the robot of the application example, it is preferable that the first rotation axis coincides with the normal line of an installation surface of the base.

Accordingly, the robot can be easily controlled.

Application Example 14

This application example is directed to a robot including a base; a first arm that is coupled to the base and rotates with a first rotation axis as an axial center; a second arm that rotates with a second rotation axis in a direction different from the first rotation axis as an axial center; a third arm that rotates with a third rotation axis in a direction parallel to the second rotation axis as an axial center; a first inertia sensor that detects the angular velocity of the first arm; a first angle sensor that detects the rotation angle of a drive source of the first arm; a second angle sensor that detects the rotation angle of a drive source of the second arm; a second (a) inertia sensor that detects the angular velocity of the third arm; a third angle sensor that detects the rotation angle of a drive source of the third arm; a control unit of the drive source of the first arm that feeds back an angular velocity derived from a detection result of the first angle sensor and an angular velocity detected from the first inertia sensor, and controls the drive source of the first arm; and a control unit of the drive source of the second arm that feeds back an angular velocity derived from a detection result of the second angle sensor, an angular velocity derived from a detection result of the third angle sensor, and an angular velocity detected from the second (a) inertia sensor, and controls the drive source of the second arm.

In this application example, while the number of the sensors to be used is minimized, the vibration in the robot can be easily and reliably suppressed. The direction of the second rotation axis and the direction of the third rotation axis are made parallel to each other, and the feedback of the control of the drive sources is performed by one inertia sensor that detects an angular velocity in the direction of the rotation axes. That is, the control of the second drive source is fed back by an angular velocity detected by the second (a) inertia sensor.

Accordingly, a huge calculation is unnecessary, and the response speed in the control of the robot can be increased. Additionally, since a calculation in which a singular point is present is unnecessary, the control of the robot can be reliably performed, and the vibration can be reliably suppressed.

Additionally, compared to a case where the inertia sensors are installed at the respective arms and the control of suppressing the vibration in each arm is performed on each arm, the number of the inertia sensors can be minimized, costs can be reduced, and the circuit configuration can be simplified.

Since the control of suppressing vibration is performed on the second drive source that rotates the second arm, using the detection result of the second (a) inertia sensor installed at the third arm on the tip side where a larger vibration than the second arm is generated, the effect of suppressing the vibration can be enhanced. Additionally, the effect of suppressing the vibration can be enhanced by controlling the operation of the second drive source that rotates the second arm closer to the base end side than the third arm.

Application Example 15

This application example is directed to a robot including a base; a first arm that is coupled to the base and rotates with a first rotation axis as an axial center; a second arm that rotates with a second rotation axis in a direction different from the first rotation axis as an axial center; a third arm that rotates with a third rotation axis in a direction parallel to the second rotation axis as an axial center; a first inertia sensor that detects the angular velocity of the first arm; a first angle sensor that detects the rotation angle of a drive source of the first arm; a second angle sensor that detects the rotation angle of a drive source of the second arm; a second (a) inertia sensor that detects the angular velocity of the third arm; a third angle sensor that detects the rotation angle of a drive source of the third arm; a control unit of the drive source of the first arm that feeds back an angular velocity derived from a detection result of the first angle sensor and an angular velocity detected from the first inertia sensor, and controls the drive source of the first arm; and a control unit of the drive source of the third arm that feeds back an angular velocity derived from a detection result of the second angle sensor, an angular velocity derived from a detection result of the third angle sensor, and an angular velocity detected from the second (a) inertia sensor, and controls the drive source of the third arm.

In the application example, while the number of the sensors to be used is minimized, the vibration in the robot can be easily and reliably suppressed. The direction of the second rotation axis and the direction of the third rotation axis are made parallel to each other, and the feedback of the control of the drive sources is performed by one inertia sensor that detects an angular velocity in the direction of the rotation axes. That is, the control of the third drive source is fed back by an angular velocity detected by the second (a) inertia sensor.

Accordingly, a huge calculation is unnecessary, and the response speed in the control of the robot can be increased. Additionally, since a calculation in which a singular point is present is unnecessary, the control of the robot can be reliably performed, and the vibration can be reliably suppressed.

Additionally, compared to a case where the inertia sensors are installed at the respective arms and the control of suppressing the vibration in each arm is performed on each arm, the number of the inertia sensors can be reduced, costs can be reduced, and the circuit configuration can be simplified.

Particularly, since the control of suppressing vibration is performed on the third drive source that rotates the third arm, using the detection result of the second (a) inertia sensor installed at the third arm on the tip side where a larger vibration than the second arm is generated, the effect of suppressing the vibration can be enhanced.

Application Example 16

This application example is directed to a robot including a plurality of different rotation axes, one inertia sensor and one angle sensor are provided so as to correspond to each of the different rotation axes, and angular velocities obtained from the angle sensor and the inertia sensor are feedback-controlled for every rotation axis corresponding to the angle sensor and the inertia sensor.

Accordingly, it is possible to provide a multi-joint robot that can freely work in a three-dimensional space but easily and reliably suppresses vibration caused by driving.

Since the robot of the application example includes a plurality of different rotation axes, one inertia sensor and one angle sensor are provided so as to correspond to each of the different rotation axes, and angular velocities obtained from the angle sensor and the inertia sensor are feedback-controlled for every rotation axis corresponding to the angle sensor and the inertia sensor, information from the inertia sensor may be only information on at least one coordinate axis. Accordingly, for example, a coordinate axis transformation, such as the Jacobi's transformation, is unnecessary, and feedback to the controller can be made by a simple calculation.

That is, a calculation for performing feedback to the controller on the basis of huge information is unnecessary, and thereby, the response speed in the control of the robot can be increased. Additionally, since a calculation in which a singular point is present is unnecessary, the control of the robot can be reliably performed, and the vibration can be reliably suppressed. In addition, when one inertia sensor and one angle sensor may be provided so as to correspond to every different rotation axis, and a plurality of parallel rotation axes are present, one rotation axis of them may be selected from a rotation axis orthogonal to the other rotation axis, and one inertia sensor and one angle sensor may be provided for these rotation axes, respectively.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

A robot will be described below in detail on the basis of preferred embodiments shown in the accompanying drawings.

First Embodiment

Figure 1:
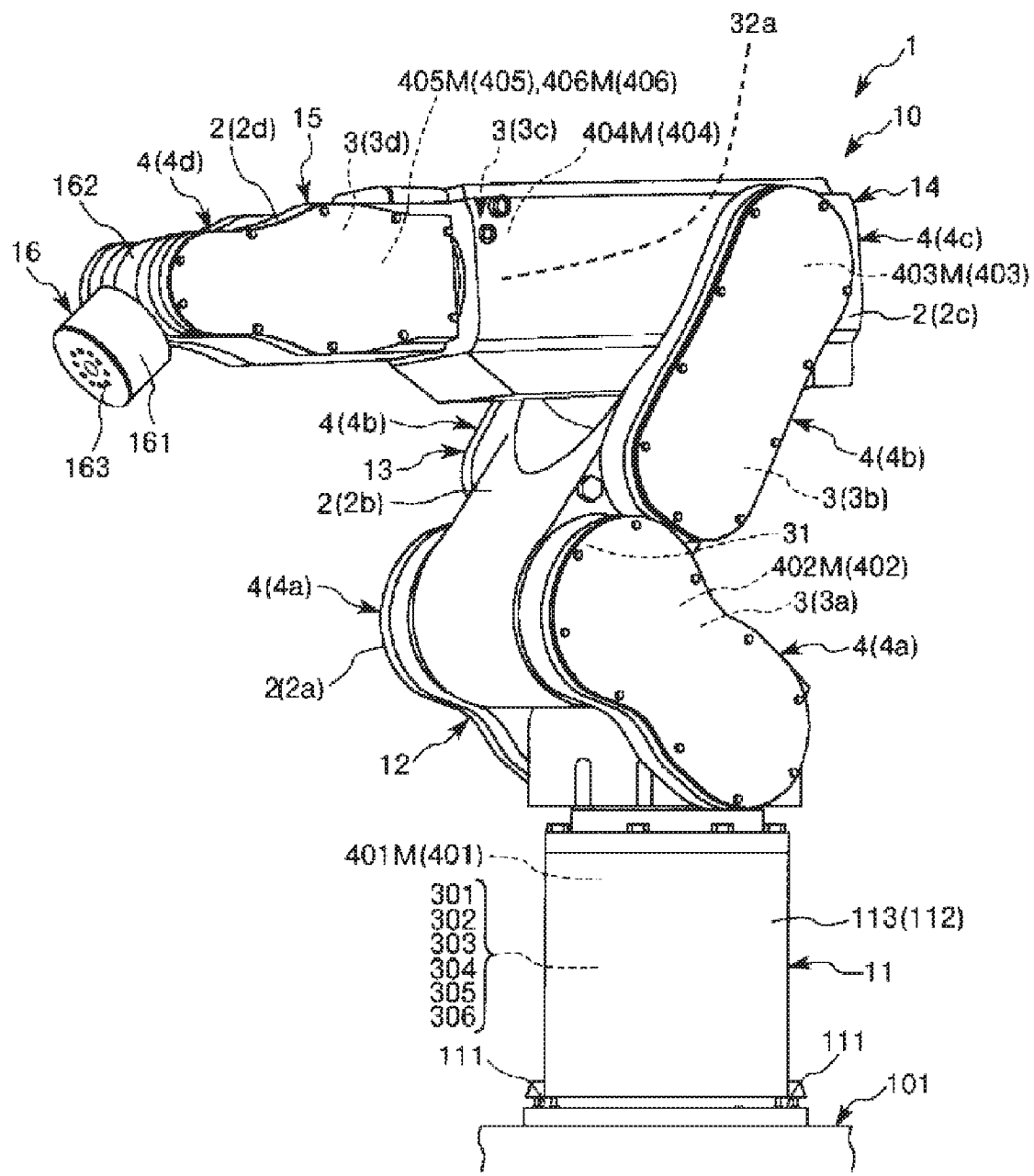
FIG. 1 is a perspective view when a first embodiment of a robot is viewed from the front side.
Figure 2:
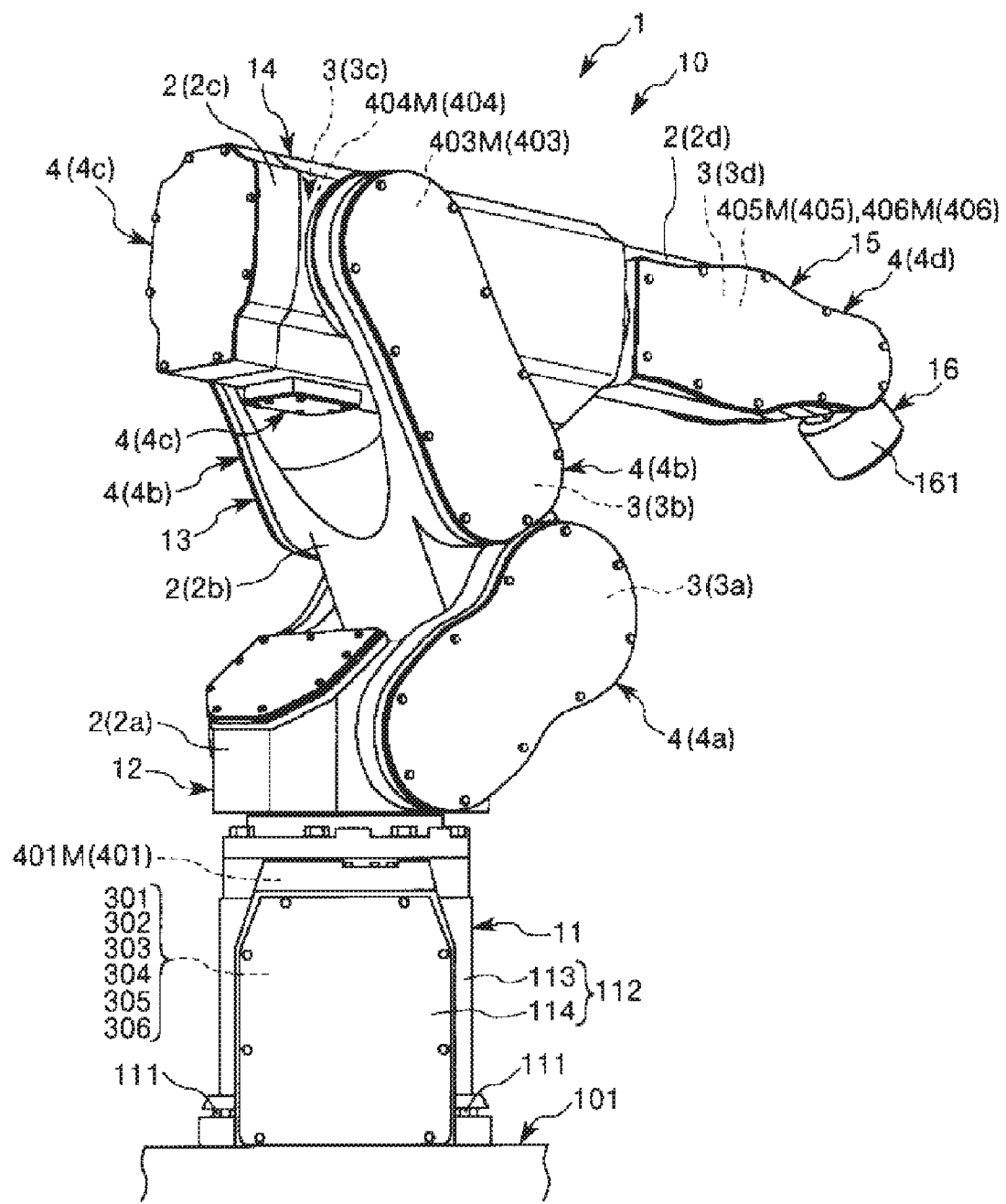
FIG. 2 is a perspective view when the robot shown in FIG. 1 is viewed from the back side.
Figure 3:
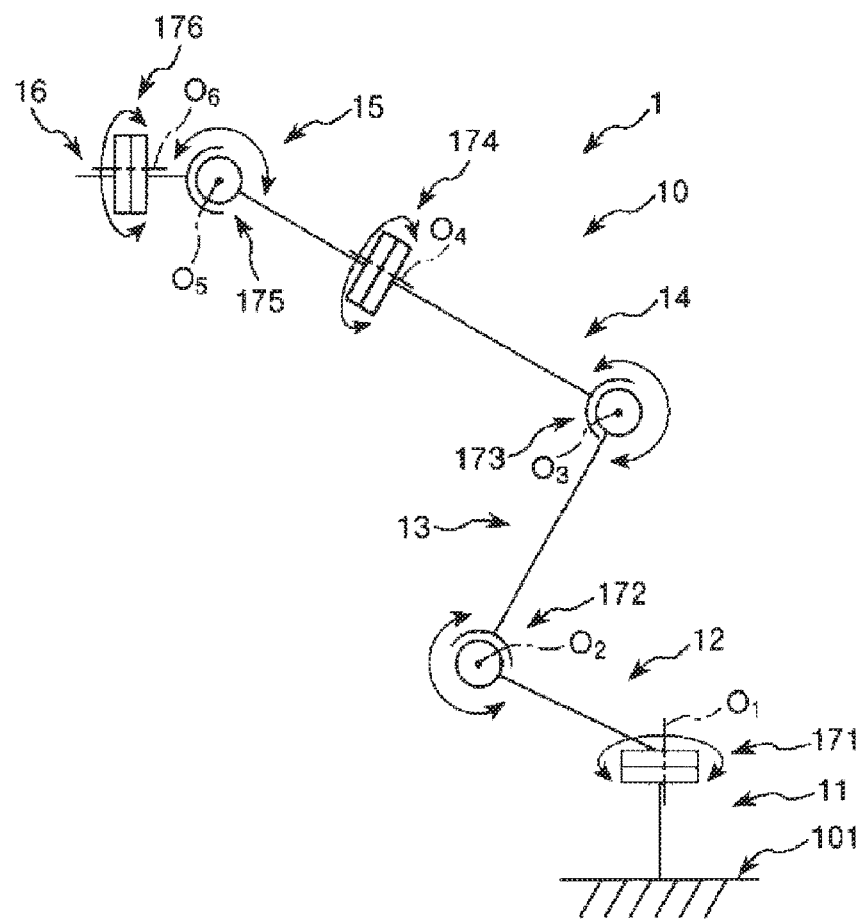
FIG. 3 is a schematic view of the robot shown in FIG. 1.
Figure 4:
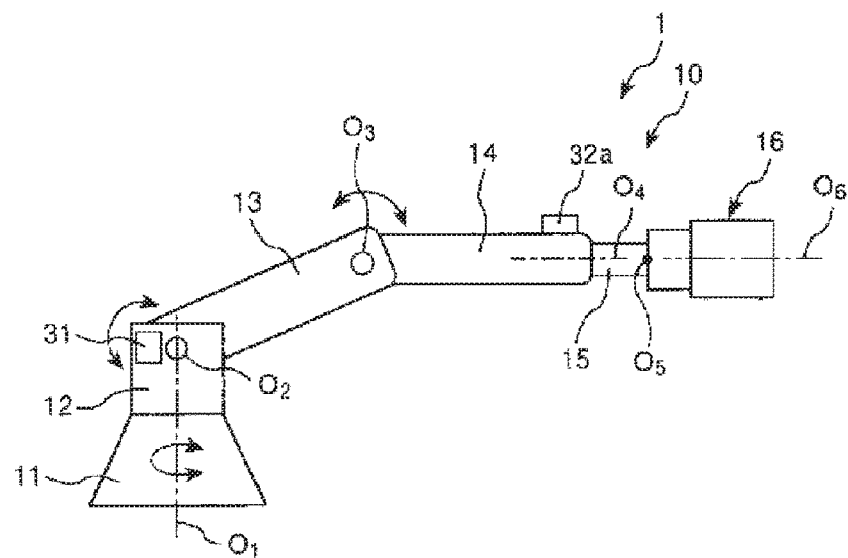
FIG. 4 is a schematic view of the robot shown in FIG. 1.
Figure 5:
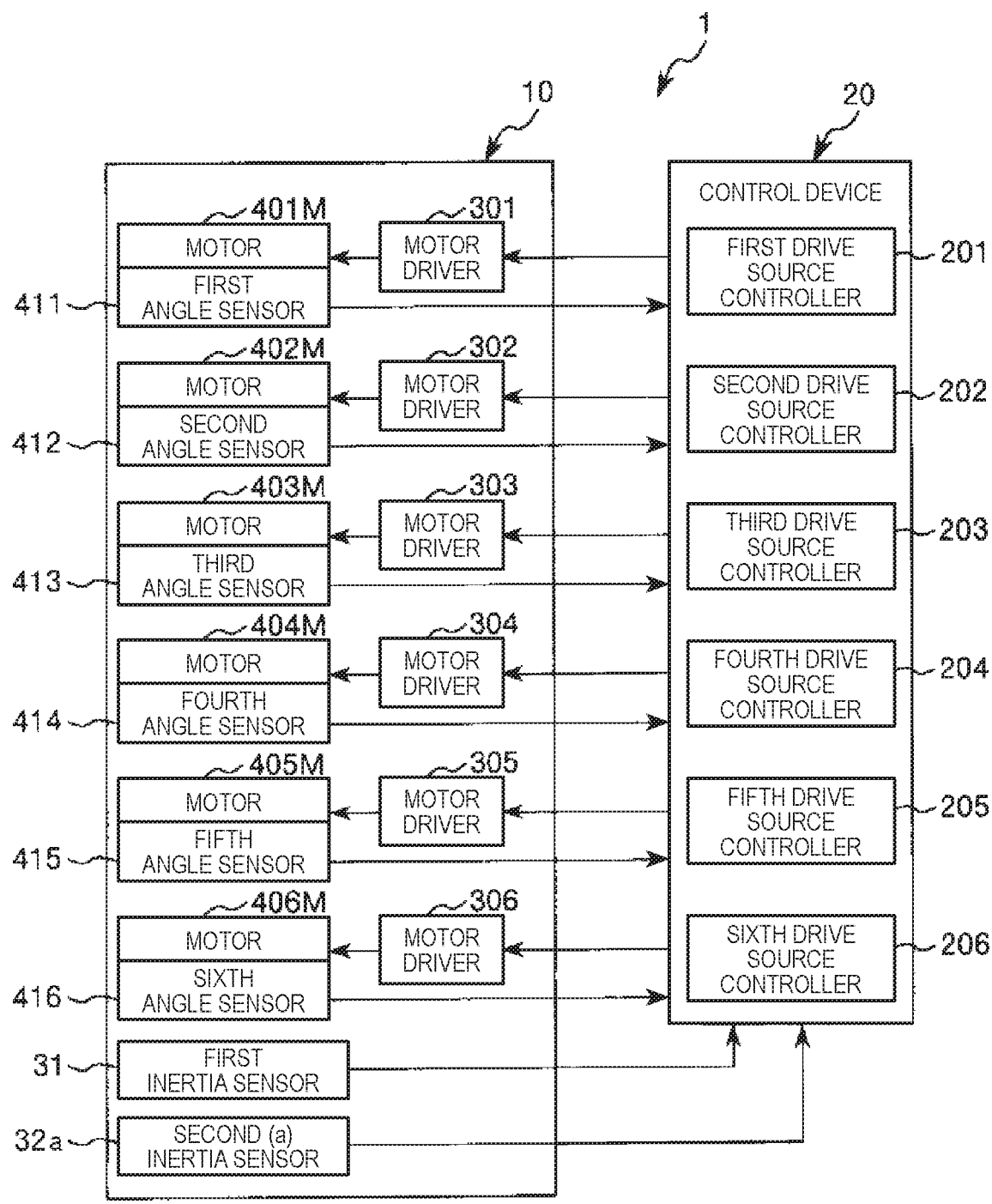
FIG. 5 is a block diagram of portions of the robot shown in FIG. 1.

FIG. 1 is a perspective view when a first embodiment of a robot is viewed from the front side. FIG. 2 is a perspective view when the robot shown in FIG. 1 is viewed from the back side. FIGS. 3 and 4 are schematic views of the robot shown in FIG. 1, respectively. FIG. 5 is a block diagram of main portions of the robot shown in FIG. 1. FIGS. 6 to 10 are block diagrams of the main portions of the robot shown in FIG. 1, respectively.

In addition, in the following, for convenience of description, the upper side in FIGS. 1 to 4 and FIG. 6 is referred to as "upper" and "upside" and the lower side is referred to as "lower" and "downside". Additionally, the base side in FIGS. 1 to 4 is referred to as a "base end", and the opposite side is referred to as a "tip". Additionally, rotation axes O2 and O3 are shown in an exaggerated manner in FIG. 4, respectively. Additionally, inertia sensors 31 and 32a are shown outside arms 12 and 14 in FIG. 4, respectively, in order to clarify the presence of the sensors.

A robot (industrial robot) 1 shown in FIGS. 1 to 4 can be used for, for example, a manufacturing process that manufactures precision mechanical equipment, such as a wrist watch, and has a robot body 10 and a control device (control unit) 20 (refer to FIG. 5) that controls the operation of the robot body 10. The robot body 10 and the control device 20 are electrically connected. Additionally, the control device 20 can be constituted by, for example, personal computers (PC) in which a central processing unit (CPU) is installed. In addition, the control device 20 is described below in more detail.

The robot body 10 includes a base 11, four arms (links) 12, 13, 14, and 15, a wrist (link) 16, and six drive sources 401, 402, 403, 404, 405, and 406. The robot body 10 is a vertical multi-joint (six-axis) robot (robot body) in which the base 11, the arms 12, 13, 14, and 15, and the wrist 16 are coupled together in the order from a base end side toward a tip side. In the vertical multi-joint robot, the base 11, the arms 12 to 15, and the wrist 16 can also be generically referred to as "arms", and the arm 12, the arm 13, the arm 14, the arm 15, and the wrist 16 can be separately referred to as a "first arm", a "second arm", a "third arm", a "fourth arm", and a "fifth or sixth arm", respectively. In addition, the wrist 16 may have the fifth arm and the sixth arm. An end effector or the like can be attached to the wrist 16.

As shown in FIGS. 3 and 4, the arms 12 to 15 and the wrist 16 are supported so as to be independently displaceable with respect to the base 11. The lengths of the arms 12 to 15 and the wrist 16 are not particularly limited, respectively. However, in the illustrated configuration, the lengths of the arms 12 to 14 are set to be larger than those of the other arm 15 and the wrist 16. In addition, for example, the length of the third arm 14 may be made smaller than the lengths of the first arm 12 and the second arm 13.

The base 11 and the first arm 12 are coupled together via a joint 171. The first arm 12 has a first rotation axis O1 parallel to the vertical direction as a rotation center, and is rotatable with respect to the base 11 around the first rotation axis O1. The first rotation axis O1 coincides with the normal line of an upper surface of a floor 101 that is an installation surface of the base 11. The rotation around the first rotation axis O1 is performed by the driving of the first drive source 401. Additionally, the first drive source 401 is driven by a motor 401M and a cable (not shown), and the motor 401M is controlled by the control device 20 via a motor driver 301 that is electrically connected thereto (refer to FIG. 5). The driving from the motor 401M may be transmitted to the first drive source 401 by a speed reducer (not shown) provided together with the motor 401M, and the speed reducer may be omitted.

The first arm 12 and the second arm 13 are coupled together via a joint 172. The second arm 13 is rotatable with respect to the first arm 12 with the second rotation axis O2 parallel to the horizontal direction as an axial center. The second rotation axis O2 is orthogonal to the first rotation axis O1. The rotation around the second rotation axis O2 is performed by the driving of the second drive source 402. Additionally, the second drive source 402 is driven by a motor 402M and a cable (not shown), and the motor 402M is controlled by the control device 20 via a motor driver 302 that is electrically connected thereto (refer to FIG. 5). The driving from the motor 402M may be transmitted to the second drive source 402 by a speed reducer (not shown) provided in addition to the motor 402M, and the speed reducer may be omitted.

The second arm 13 and the third arm 14 are coupled together via a joint 173. The third arm 14 has a rotation axis O3 parallel to the horizontal direction as a rotation center, and is rotatable with respect to the second arm 13 around the third rotation axis O3. The third rotation axis O3 is parallel to the second rotation axis O2. The rotation around the third rotation axis O3 is performed by the driving of the third drive source 403. Additionally, the third drive source 403 is driven by a motor 403M and a cable (not shown), and the motor 403M is controlled by the control device 20 via a motor driver 303 that is electrically connected thereto (refer to FIG. 5). The driving from the motor 403M may be transmitted to the third drive source 403 by a speed reducer (not shown) provided in addition to the motor 403M, and the speed reducer may be omitted.

The third arm 14 and the fourth arm 15 are coupled together via a joint 174. The fourth arm 15 has a fourth rotation axis O4 parallel to the direction of a central axis of the third arm 14 as a rotation center, and is rotatable with respect to the third arm 14 (base 11) around the fourth rotation axis O4. The fourth rotation axis O4 is orthogonal to the third rotation axis O3. The rotation around the fourth rotation axis O4 is performed by the driving of the fourth drive source 404. Additionally, the fourth drive source 404 is driven by a motor 404M and a cable (not shown), and the motor 404M is controlled by the control device 20 via a motor driver 304 that is electrically connected thereto (refer to FIG. 5). The driving from the motor 404M may be transmitted to the fourth drive source 404 by a speed reducer (not shown) provided together with the motor 404M, and the speed reducer may be omitted. In addition, the fourth rotation axis O4 may be parallel to an axis orthogonal to the third rotation axis O3.

The fourth arm 15 and the wrist 16 are coupled together via a joint 175. The wrist 16 has a fifth rotation axis O5 parallel to the horizontal direction (y-axis direction) as a rotation center, and is rotatable with respect to the fourth arm 15 around the fifth rotation axis O5. The fifth rotation axis O5 is orthogonal to the fourth rotation axis O4. The rotation around the fifth rotation axis O5 is performed by the driving of the fifth drive source 405. Additionally, the fifth drive source 405 is driven by a motor 405M and a cable (not shown), and the motor 405M is controlled by the control device 20 via a motor driver 305 that is electrically connected thereto (refer to FIG. 5). The driving from the motor 405M may be transmitted to the fifth drive source 405 by a speed reducer (not shown) provided together with the motor 405M, and the speed reducer may be omitted. Additionally, the wrist 16 has a sixth rotation axis O6 vertical to the fifth rotation axis O5 as a rotation center, and is also rotatable via a joint 176 around the sixth rotation axis O6. The rotation axis O6 is orthogonal to the rotation axis O5. The rotation around the sixth rotation axis O6 is performed by the driving of the sixth drive source 406. Additionally, the sixth drive source 406 is driven by a motor 406M and a cable (not shown), and the motor 406M is controlled by the control device 20 via a motor driver 306 that is electrically connected thereto (refer to FIG. 5). The driving from the motor 406M may be transmitted to the sixth drive source 406 by a speed reducer (not shown) provided in addition to the motor 406M, and the speed reducer may be omitted. In addition, the fifth rotation axis O5 may be parallel to an axis orthogonal to the fourth rotation axis O4, and the sixth rotation axis O6 may be parallel to an axis orthogonal to the fifth rotation axis O5.

Additionally, the first inertia sensor 31 is installed at the first arm 12. The first inertia sensor 31 detects the angular velocity of the first arm 12 around the first rotation axis O1. Although the installation position of the first inertia sensor 31 at the first arm 12 is not particularly limited, a tip portion of the first arm 12 is preferable. In the present embodiment, the first inertia sensor 31 is installed at the tip portion inside the first arm 12. Since the vibration in the first arm 12 is maximized at the tip portion of the first arm, this can more reliably suppress the vibration in the robot 1. In addition, it should be understood that the first inertia sensor 31 may be installed at a base end portion of the first arm 12.

Additionally, the second (a) inertia sensor 32a is installed at the third arm 14. The second (a) inertia sensor 32a detects the angular velocity of the third arm 14 around the second rotation axis O2. Although the installation position of the second (a) inertia sensor 32a at the third arm 14 is not particularly limited, a tip portion of the third arm 14 is preferable. In the present embodiment, the second (a) inertia sensor 32a is installed at the tip portion inside the third arm 14. Since the vibration in the third arm 14 is maximized at the tip portion of the third arm, this can more reliably suppress the vibration in the robot 1. In addition, it should be understood that the second (a) inertia sensor 32a may be installed at a base end portion of the third arm 14.

Additionally, the first inertia sensor 31 and the second (a) inertia sensor 32a are not particularly limited, respectively, and in the present embodiment, for example, a gyroscope sensor, an acceleration sensor, or the like can be used.

Here, in the robot 1, the vibration in the entire robot 1 is suppressed by suppressing the vibration in the arms 12, 13, and 14. However, in order to suppress the vibration in the arms 12, 13, and 14, inertia sensors are not installed at all the arms 12, 13, and 14. As mentioned above, the first inertia sensor 31 and the second (a) inertia sensor 32a are installed only at the arms 12 and 14, and the operation of the drive sources 401 and 402 is controlled on the basis of the detection results of the first inertia sensor 31 and the second (a) inertia sensor 32a. Accordingly, compared to a case where inertia sensors are installed at all the arms 12, 13, and 14, the number of the inertia sensors can be reduced, costs can be reduced, and the circuit configuration can be simplified.

A first angle sensor 411, a second angle sensor 412, a third angle sensor 413, a fourth angle sensor 414, a fifth angle sensor 415, and a sixth angle sensor 416 are provided at respective motors or speed reducers in the drive sources 401 to 406. Encoders, rotary encoders, or the like can be used as the angle sensors. The angle sensors 411 to 416 detect the rotation angles of the rotating shafts of the motors or speed reducers of the drive sources 401 to 406, respectively. The motors of the drive sources 401 to 406 are not particularly limited, respectively. For example, it is preferable to use servomotors, such as AC servo motors or DC servo motors. Additionally, the respective cables may be inserted through the robot body 10, respectively.

As shown in FIG. 5, the robot body 10 is electrically connected to the control device 20. That is, the drive sources 401 to 406, the angle sensors 411 to 416, and the inertia sensors 31 and 32a are electrically connected to the control device 20, respectively.

The control device 20 can independently operate the arms 12 to 15 and the wrist 16, respectively, that is, can independently control the drive sources 401 to 406 via the motor drivers 301 to 306, respectively. In this case, the control device 20 performs detection by the angle sensors 411 to 416, the first inertia sensor 31, and the second (a) inertia sensor 32a, and controls the driving, for example, angular velocity, rotation angle, or the like of the drive sources 401 to 406 on the basis of the detection results, respectively. A control program is stored in advance in a recording medium built in the control device 20.

As shown in FIG. 1 and FIG. 2, when the robot 1 is a vertical multi-joint robot, the base 11 is a portion that is located on the lowermost side of the vertical multi-joint robot and is fixed to the floor 101 of an installation space. The fixing method is not particularly limited, and for example, in the present embodiment shown in FIGS. 1 and 2, a fixing method using a plurality of bolts 111 is used. In addition, a fixing place in the installation space of the base 11 can also be the wall or ceiling of the installation space other than the floor.

The base 11 has a hollow base body (housing) 112. The base body 112 can be separated into a cylindrical portion 113 that has a cylindrical shape, and a box-shaped portion 114 that is integrally formed at an outer peripheral portion of the cylindrical portion 113 and has a box shape. For example, the motor 401M and the motor drivers 301 to 306 are stored in such a base body 112.

The arms 12 to 15 have a hollow arm body 2, a drive mechanism 3, and a sealing unit 4, respectively. In addition, in the following, for convenience of description, the arm body 2, the drive mechanism 3, and the sealing unit 4 of the first arm 12 may be referred to as an "arm body 2a", a "drive mechanism 3a", and a "sealing unit 4a", respectively, the arm body 2, the drive mechanism 3, and the sealing unit 4 of the second arm 13 may be referred to as an "arm body 2b", a "drive mechanism 3b", and a "sealing unit 4b", respectively, the arm body 2, the drive mechanism 3, and the sealing unit 4 of the third arm 14 may be referred to as an "arm body 2c", a "drive mechanism 3c", and a "sealing unit 4c", respectively, and the arm body 2, the drive mechanism 3, and the sealing unit 4 of the fourth arm 15 may be referred to as an "arm body 2d", a "drive mechanism 3d", and a "sealing unit 4d", respectively.

Additionally, the joints 171 to 176 have rotation support mechanisms (not shown), respectively. The rotation support mechanisms are a mechanism that supports one of two arms coupled to each other so as to be rotatable to the other, a mechanism that supports one of the base 11 and the first arm 12 coupled to each other so as to be rotatable to the other, and a mechanism that supports one of the fourth arm 15 and the wrist 16 coupled to each other so as to be rotatable to the other. When the fourth arm 15 and the wrist 16 that are coupled to each other are taken as an example, the rotation support mechanism can rotate the wrist 16 with respect to the fourth arm 15. Additionally, each rotation support mechanism has a speed reducer (not shown) that reduces the rotating speed of a corresponding motor in a predetermined reduction ratio, and transmits the driving force thereof to a corresponding arm, the wrist body 161 of the wrist 16, and a support ring 162.

The first arm 12 is coupled to an upper end portion (tip portion) of the base 11 in a posture in which the first arm 12 inclines with respect to the horizontal direction. In the first arm 12, the drive mechanism 3a has the motor 402M, and is stored within the arm body 2a. Additionally, the inside of the arm body 2a is hermetically sealed by the sealing unit 4a.

The second arm 13 is coupled to a tip portion of the first arm 12. In the second arm 13, the drive mechanism 3b has the motor 403M, and is stored within the arm body 2b. Additionally, the inside of the arm body 2b is hermetically sealed by the sealing unit 4b.

The third arm 14 is coupled to a tip portion of the second arm 13. In the third arm 14, the drive mechanism 3c has the motor 404M, and is stored within the arm body 2c. Additionally, the inside of the arm body 2c is hermetically sealed by the sealing unit 4c.

The fourth arm 15 is coupled to a tip portion of the third arm 14 in parallel with the direction of a central axis thereof. In the arm 15, the drive mechanism 3d has the motors 405M and 406M, and is stored within the arm body 2d. Additionally, the inside of the arm body 2d is hermetically sealed by the sealing unit 4d.

The wrist 16 is coupled to a tip portion (end portion opposite the base 11) of the fourth arm 15. For example, a manipulator (not shown) that grips precision mechanical equipment, such as a wrist watch, is detachably mounted on a tip portion (an end portion opposite the fourth arm 15) of the wrist 16. In addition, the manipulator is not particularly limited, and includes, for example, a manipulator of a configuration having a plurality of fingers. The robot 1 can convey the precision mechanical equipment by controlling the operation of the arms 12 to 15, the wrist 16, or the like with the precision mechanical equipment gripped by the manipulator.

The wrist 16 has the wrist body (sixth arm) 161 that has a cylindrical shape, and the support ring (fifth arm) 162 that is configured separately from the wrist body 161, is provided at a base end portion of the wrist body 161, and forms a ring shape.

A tip face 163 of the wrist body 161 is a flat surface, and serves as a mounting surface on which the manipulator is mounted. Additionally, the wrist body 161 is coupled to the drive mechanism 3d of the fourth arm 15 via the joint 176, and is rotated around the rotation axis O6 by the driving of the motor 406M of the drive mechanism 3d.

The support ring 162 is coupled to the drive mechanism 3d of the fourth arm 15 via the joint 175, and the entire wrist body 161 is rotated around the rotation axis O5 by the driving of the motor 405M of the drive mechanism 3d.

Next, the configuration of the control device 20 will be described with reference to FIGS. 5 and 6 to 10.

As shown in FIGS. 5 and 6 to 10, the control device 20 has a first drive source controller (first drive source control unit) (first angular velocity command) 201 that controls the operation of the first drive source 401, a second drive source controller (second drive source control unit) (second angular velocity command) 202 that controls the operation of the second drive source 402, a third drive source controller (third drive source control unit) (third angular velocity command) 203 that controls the operation of the third drive source 403, a fourth drive source controller (fourth drive source control unit) (fourth angular velocity command) 204 that controls the operation of the fourth drive source 404, a fifth drive source controller (fifth drive source control unit) (fifth angular velocity command) 205 that controls the operation of the fifth drive source 405, and a sixth drive source controller (sixth drive source control unit) (sixth angular velocity command) 206 that controls the operation of the sixth drive source 406.

Figure 6:
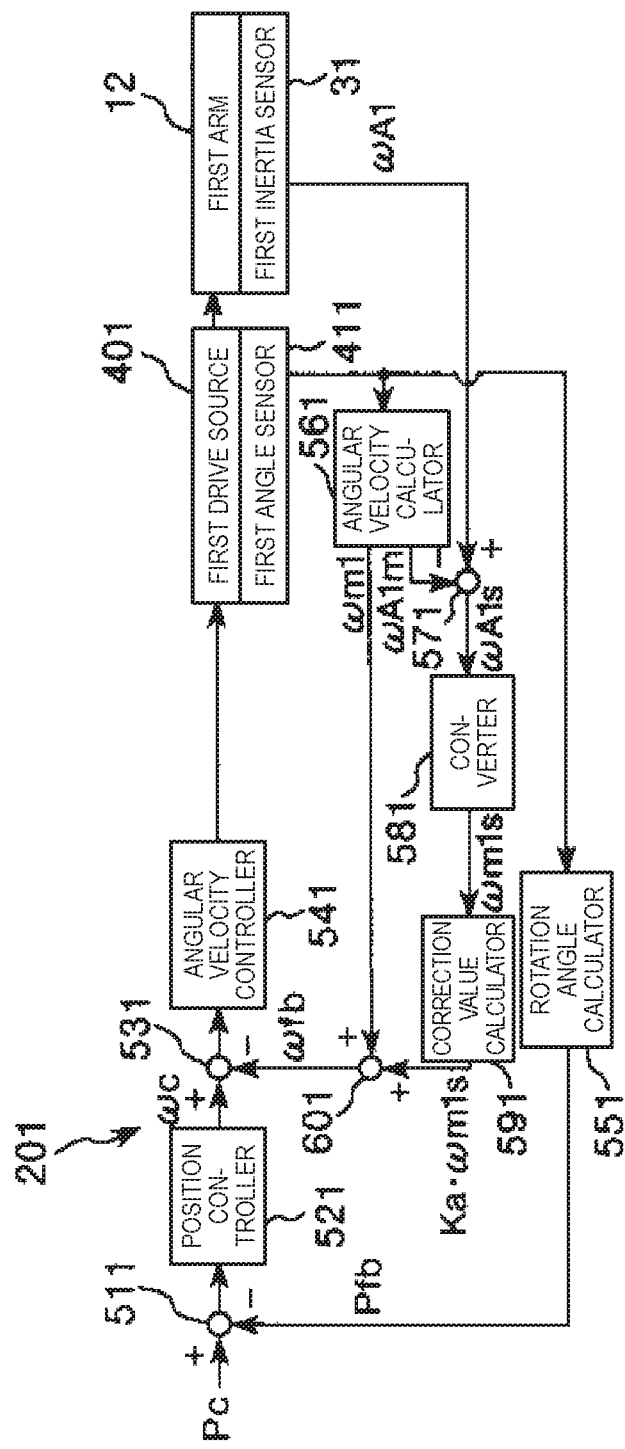
FIG. 6 is a block diagram of the portions of the robot shown in FIG. 1.

As shown in FIG. 6, the first drive source controller 201 has a subtractor 511, a position controller 521, a subtractor 531, an angular velocity controller 541, a rotation angle calculator 551, an angular velocity calculator 561, a subtractor 571, a converter 581, a correction value calculator 591, and an adder 601.

Figure 7:
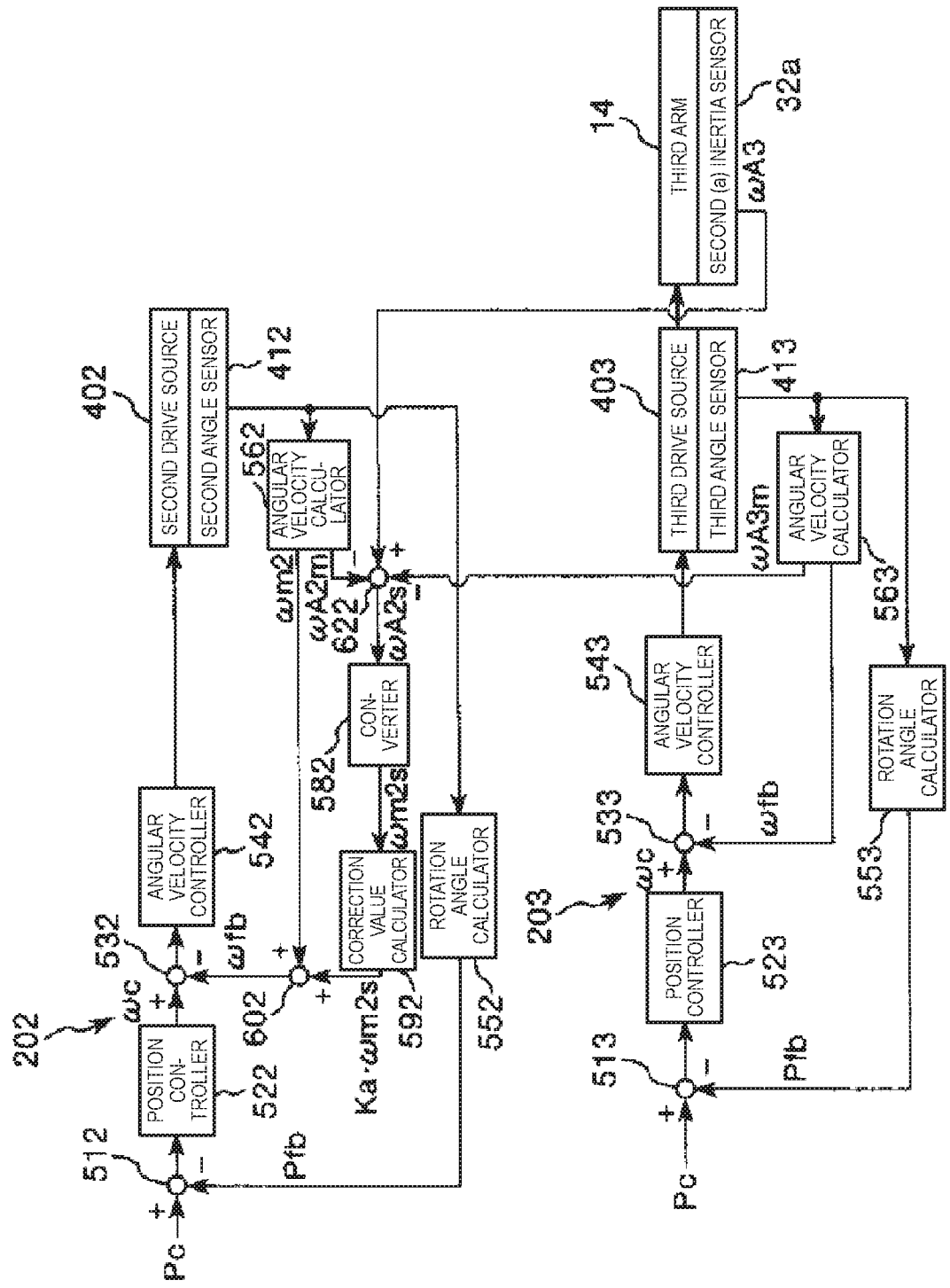
FIG. 7 is a block diagram of the portions of the robot shown in FIG. 1.

As shown in FIG. 7, the second drive source controller 202 has a subtractor 512, a position controller 522, a subtractor 532, an angular velocity controller 542, a rotation angle calculator 552, an angular velocity calculator 562, an adder-subtractor 622, a converter 582, a correction value calculator 592, and an adder 602.

As shown in FIG. 7, the third drive source controller 203 has a subtractor 513, a position controller 523, a subtractor 533, an angular velocity controller 543, a rotation angle calculator 553, and an angular velocity calculator 563.

Figure 8:
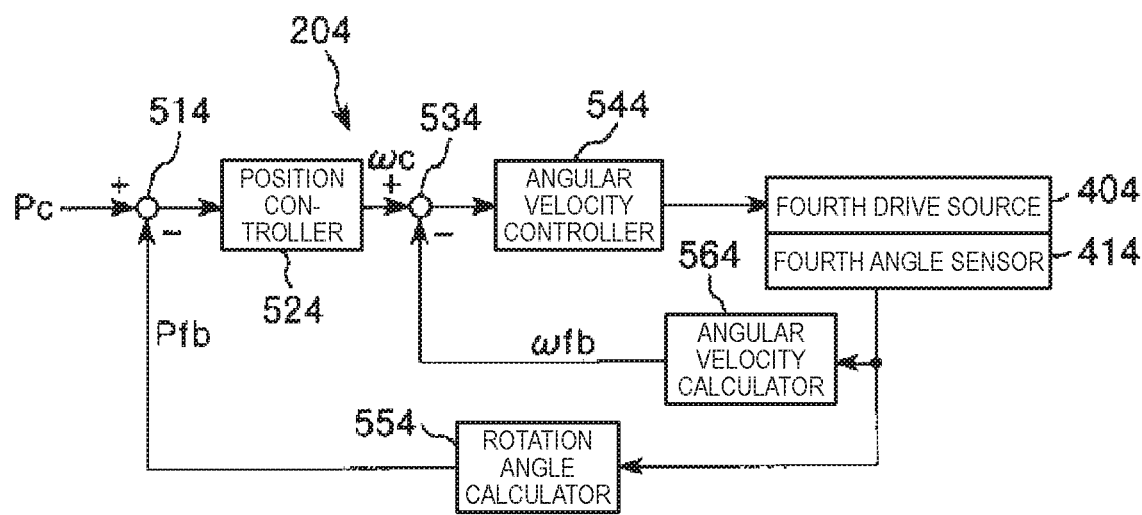
FIG. 8 is a block diagram of the portions of the robot shown in FIG. 1.

As shown in FIG. 8, the fourth drive source controller 204 has a subtractor 514, a position controller 524, a subtractor 534, an angular velocity controller 544, a rotation angle calculator 554, and an angular velocity calculator 564.

Figure 9:
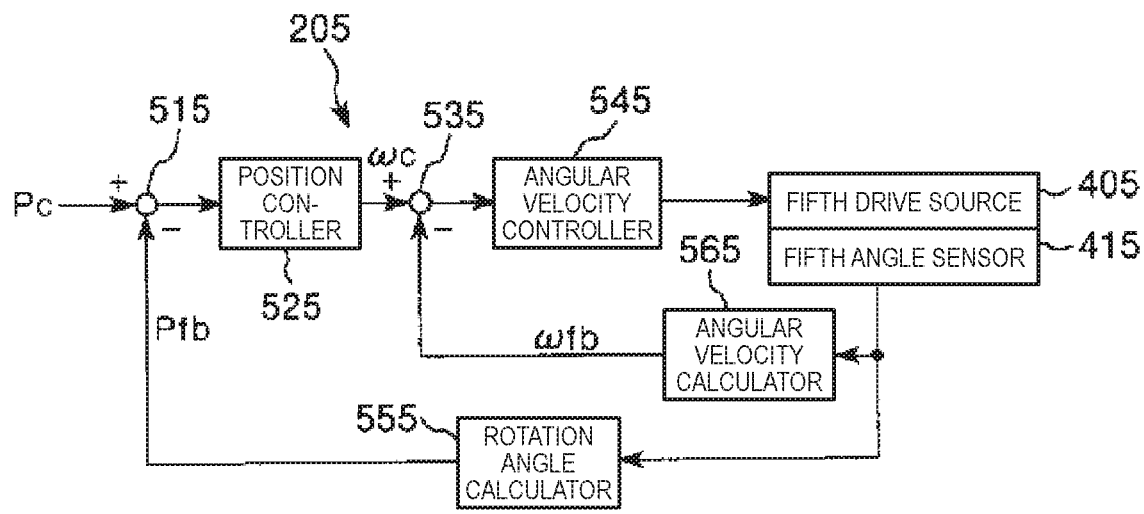
FIG. 9 is a block diagram of the portions of the robot shown in FIG. 1.

As shown in FIG. 9, the fifth drive source controller 205 has a subtractor 515, a position controller 525, a subtractor 535, an angular velocity controller 545, a rotation angle calculator 555, and an angular velocity calculator 565.

Figure 10:
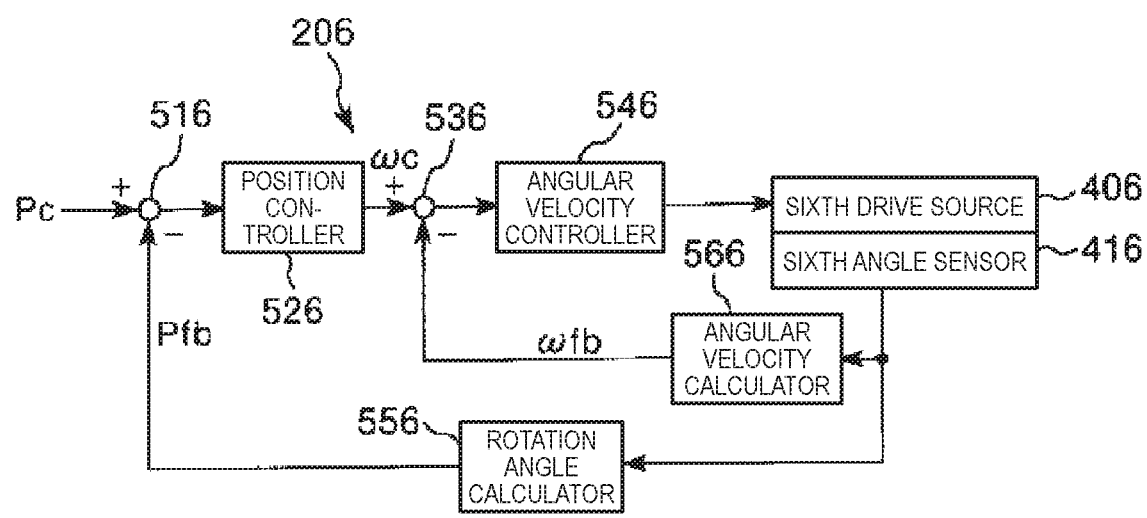
FIG. 10 is a block diagram of the portions of the robot shown in FIG. 1.

As shown in FIG. 10, the sixth drive source controller 206 has a subtractor 516, a position controller 526, a subtractor 536, an angular velocity controller 546, a rotation angle calculator 556, and an angular velocity calculator 566.

Here, the control device 20 calculates a target position of the wrist 16 on the basis of the contents of processing to be performed by the robot 1, and generates a track for moving the wrist 16 to the target position. The control device 20 measures the rotation angles of the respective drive sources 401 to 406 for every predetermined control cycle so that the wrist 16 moves along the generated track, and outputs values calculated on the basis of the measurement results to the drive source controllers 201 to 206 as position commands Pc of the respective drive sources 401 to 406, respectively (refer to FIGS. 6 to 10). In addition, although "values are input and output" or the like are written in the above and the following, this means "signals corresponding to the values are input and output".

As shown in FIG. 6, in addition to a position command Pc of the first drive source 401, detection signals are input from the first angle sensor 411 and the first inertia sensor 31, respectively, to the first drive source controller 201. The first drive source controller 201 drives the first drive source 401 by feedback control using the respective detection signals so that a rotation angle (position feedback value Pfb) of the first drive source calculated from the detection signal of the first angle sensor 411 becomes the position command Pc and an angular velocity feedback value ωfb to be described below becomes an angular velocity command ωc to be described below.

That is, the position command Pc is input to the subtractor 511 of the first drive source controller 201, and the position feedback value Pfb to be described below is input from the rotation angle calculator 551. In the rotation angle calculator 551, the number of pulses input from the first angle sensor 411 is counted, and the rotation angle of the first drive source 401 according to the counted value is output to the subtractor 511 as the position feedback value Pfb. The subtractor 511 outputs a deviation (value obtained by subtracting the position feedback value Pfb from a targeted value of the rotation angle of the first drive source 401) between the position command Pc and the position feedback value Pfb to the position controller 521.

The position controller 521 performs predetermined calculation processing using the deviation input from the subtractor 511 and a proportional gain that is a predetermined factor, and calculates the targeted value of the angular velocity of the first drive source 401 according to the deviation. The position controller 521 outputs a signal showing the targeted value (command value) of the angular velocity of the first drive source 401 to the subtractor 531 as the angular velocity command (first angular velocity command) ωc. In addition, in the present embodiment, proportional control (P control) is performed as the feedback control. However, the feedback control is not limited to this.

The angular velocity command ωc and the angular velocity feedback value ωfb to be described below are input to the subtractor 531. The subtractor 531 outputs a deviation (value obtained by subtracting the angular velocity feedback value ωfb from the targeted value of the angular velocity of the first drive source 401) between the angular velocity command ωc and the angular velocity feedback value ωfb to the angular velocity controller 541.

The angular velocity controller 541 performs predetermined calculation processing including integration, using the deviation input from the subtractor 531, a proportional gain that is a predetermined factor, an integration gain, or the like, thereby generating a driving signal (driving current) of the first drive source 401 according to the deviation and supplying the driving signal to the motor 401M via the motor driver 301. In addition, in the present embodiment, the PI control (proportional integration control) is performed as the feedback control. However, the feedback control is not limited to this.

In this way, the feedback control is performed and the driving current of the first drive source 401 is controlled so that the position feedback value Pfb is as equal to the position command Pc as possible and the angular velocity feedback value ωfb is as equal to the angular velocity command ωc as possible.

Next, the angular velocity feedback value ωfb in the first drive source controller 201 will be described.

In the angular velocity calculator 561, an angular velocity ωm1 of the first drive source 401 is calculated on the basis of the frequency of a pulse signal input from the first angle sensor 411, and the angular velocity ωm1 is output to the adder 601.

Additionally, in the angular velocity calculator 561, an angular velocity ωA1m of the first arm 12 around the rotation axis O1 is calculated on the basis of the frequency of the pulse signal input from the first angle sensor 411, and the angular velocity ωA1m is output to the subtractor 571.

In addition, the angular velocity ωA1m is a value obtained by dividing the angular velocity ωm1 by a reduction ratio between the motor 401M of the first drive source 401 and the first arm 12, that is, in the joint 171.

Additionally, the angular velocity of the first arm 12 around the rotation axis O1 is detected by the first inertia sensor 31. A detection signal of the first inertia sensor 31, that is, an angular velocity ωA1 of the first arm 12 around the rotation axis O1 detected by the first inertia sensor 31 is output to the subtractor 571.

The angular velocity ωA1 and the angular velocity ωA1m are input to the subtractor 571, and the subtractor 571 outputs a value ωA1s (=ωA1−ωA1m) obtained by subtracting the angular velocity ωA1m from the angular velocity ωA1 to the converter 581. The value ωA1s is equivalent to a vibration component (vibration angular velocity) of the angular velocity of the first arm 12 around the rotation axis O1. Hereinafter, ωA1s is referred to as a vibration angular velocity. In the present embodiment, feedback control is performed in which the vibration angular velocity ωA1s (in detail, an angular velocity ωm1s in the motor 401M that is a value generated on the basis of the vibration angular velocity ωA1s) is multiplied by a gain Ka to be described below and is returned to the input side of the drive source 401. Specifically, feedback control is performed on the drive source 401 so that the vibration angular velocity ωA1s becomes as close to 0 as possible. Accordingly, the vibration in the robot 1 can be suppressed. In addition, the angular velocity of the drive source 401 is controlled in the feedback control.

The converter 581 converts the vibration angular velocity ωA1s into the angular velocity ωm1s in the first drive source 401, and outputs the angular velocity ωm1s to the correction value calculator 591. This conversion can be obtained by multiplying the vibration angular velocity ωA1s by the reduction ratio between the motor 401M of the first drive source 401 and the first arm 12, that is, in the joint 171.

The correction value calculator 591 multiplies the angular velocity ωm1s by a gain (feedback gain) Ka that is a predetermined factor, obtains a correction value (first correction component) Ka·ωm1s, and outputs the correction value Ka·ωm1s to the adder 601.

The angular velocity ωm1 and the correction value Ka·ωm1s are input to the adder 601. The adder 601 outputs an additional value of the angular velocity ωm1 and the correction value Ka·ωm1s to the subtractor 531 as the angular velocity feedback value ωfb. In addition, the subsequent operation is as mentioned above.

As shown in FIG. 7, in addition to a position command Pc of the second drive source 402, detection signals are input from the second angle sensor 412 and the second (a) inertia sensor 32a, respectively, to the second drive source controller 202. Additionally, an angular velocity ωA3m of the third arm 14 around the rotation axis O3 is input from the third drive source controller 203 to the second drive source controller 202. The second drive source controller 202 drives the second drive source 402 by feedback control using the respective detection signals so that a rotation angle (position feedback value Pfb) of the second drive source 402 calculated from the detection signal of the second angle sensor 412 becomes the position command Pc and an angular velocity feedback value ωfb to be described below becomes an angular velocity command ωc to be described below.

That is, the position command Pc is input to the subtractor 512 of the second drive source controller 202, and the position feedback value Pfb to be described below is input from the rotation angle calculator 552. In the rotation angle calculator 552, the number of pulses input from the second angle sensor 412 is counted, and the rotation angle of the second drive source 402 according to the counted value is output to the subtractor 512 as the position feedback value Pfb. The subtractor 512 outputs a deviation (value obtained by subtracting the position feedback value Pfb from a targeted value of the rotation angle of the second drive source 402) between the position command Pc and the position feedback value Pfb to the position controller 522.

The position controller 522 performs predetermined calculation processing using the deviation input from the subtractor 512 and a proportional gain that is a predetermined factor, and calculates the targeted value of the angular velocity of the second drive source 402 according to the deviation. The position controller 522 outputs a signal showing the targeted value (command value) of the angular velocity of the second drive source 402 to the subtractor 532 as the angular velocity command (second angular velocity command) ωc. In addition, in the present embodiment, proportional control (P control) is performed as the feedback control. However, the feedback control is not limited to this.

The angular velocity command ωc and the angular velocity feedback value ωfb to be described below are input to the subtractor 532. The subtractor 532 outputs a deviation (value obtained by subtracting the angular velocity feedback value ωfb from the targeted value of the angular velocity of the second drive source 402) between the angular velocity command ωc and the angular velocity feedback value ωfb to the angular velocity controller 542.

The angular velocity controller 542 performs predetermined calculation processing including integration, using the deviation input from the subtractor 532, a proportional gain that is a predetermined factor, an integration gain, or the like, thereby generating a driving signal (driving current) of the second drive source 402 according to the deviation and supplying the driving signal to the motor 402M via the motor driver 302. In addition, in the present embodiment, PI control is performed as the feedback control. However, the feedback control is not limited to this.

In this way, the feedback control is performed and the driving current of the second drive source 402 is controlled so that the position feedback value Pfb is as equal to the position command Pc as possible and the angular velocity feedback value ωfb is as equal to the angular velocity command ωc as possible. In addition, since the rotation axis O2 is orthogonal to the rotation axis O1, the rotation axis is not influenced by the operation or vibration of the first arm 12, and the operation of the second drive source 402 can be controlled independently from the first drive source 401.

Next, the angular velocity feedback value ωfb in the second drive source controller 202 will be described.

In the angular velocity calculator 562, an angular velocity ωm2 of the second drive source 402 is calculated on the basis of the frequency of a pulse signal input from the second angle sensor 412, and the angular velocity ωm2 is output to the adder 602.

Additionally, in the angular velocity calculator 562, an angular velocity ωA2m of the second arm 13 around the rotation axis O2 is calculated on the basis of the frequency of the pulse signal input from the second angle sensor 412, and the angular velocity ωA2m is output to the adder-subtractor 622. In addition, the angular velocity ωA2m is a value obtained by dividing the angular velocity ωm2 by a reduction ratio between the motor 402M of the second drive source 402 and the second arm 13, that is, in the joint 172.

Additionally, the angular velocity of the third arm 14 around the rotation axis O2 is detected by the second (a) inertia sensor 32a. A detection signal of the second (a) inertia sensor 32a, that is, an angular velocity ωA3 of the third arm 14 around the rotation axis O2 detected by the second (a) inertia sensor 32a is output to the adder-subtractor 622. In addition, since the rotation axes O2 and O3 are orthogonal to the rotation axis O1, the angular velocity of the third arm 14 around the rotation axis O2 can be easily and reliably obtained without being influenced by the operation or vibration of the first arm 12.

Additionally, an angular velocity ωA3m of the third arm 14 around the rotation axis O3 is output from the angular velocity calculator 563 of the third drive source controller 203 to be described below to the adder-subtractor 622.

The angular velocity ωA3, the angular velocity ωA2m, and the angular velocity ωA3m are input to the adder-subtractor 622, and the adder-subtractor 622 outputs a value ωA2s (=ωA3−ωA2m−ωA3m) obtained by subtracting the angular velocity ωA2m and the angular velocity ωA3m from the angular velocity ωA3 to the converter 582. The value ωA2s is equivalent to a vibration component (vibration angular velocity) of the total angular velocity of the second arm 13 and the third arm 14 around the rotation axis O2. Hereinafter, ωA2s is referred to as a vibration angular velocity. In the present embodiment, feedback control is performed in which the vibration angular velocity ωA2s (in detail, an angular velocity (m2s in the motor 402M that is a value generated on the basis of the vibration angular velocity ωA2s) is multiplied by a gain Ka to be described below and is returned to the input side of the second drive source 402. Specifically, feedback control is performed on the second drive source 402 so that the vibration angular velocity ωA2s becomes as close to 0 as possible. Accordingly, the vibration in the robot 1 can be suppressed. In addition, the angular velocity of the second drive source 402 is controlled in the feedback control.

The converter 582 converts the vibration angular velocity ωA2s into the angular velocity ωm2s in the second drive source 402, and outputs the angular velocity ωm2s to the correction value calculator 592. This conversion can be obtained by multiplying the vibration angular velocity ωA2s by the reduction ratio between the motor 402M of the second drive source 402 and the second arm 13, that is, in the joint 172.

The correction value calculator 592 multiplies the angular velocity ωm2s by a gain (feedback gain) Ka that is a predetermined factor, obtains a correction value (second correction component) Ka·ωm2s, and outputs the correction value Ka·ωm2s to the adder 602. In addition, the gain Ka in the second drive source controller 202 and the gain Ka in the first drive source controller 201 may be the same or may be different.

The angular velocity ωm2 and the correction value Ka·ωm2s are input to the adder 602. The adder 602 outputs an additional value of the angular velocity ωm2 and the correction value Ka·ωm2s to the subtractor 532 as the angular velocity feedback value ωfb. In addition, the subsequent operation is as mentioned above.

As shown in FIG. 7, in addition to a position command Pc of the third drive source 403, a detection signal is input from the third angle sensor 413 to the third drive source controller 203. The third drive source controller 203 drives the third drive source 403 by feedback control using the respective detection signals so that a rotation angle (position feedback value Pfb) of the third drive source 403 calculated from the detection signal of the third angle sensor 413 becomes the position command Pc and an angular velocity feedback value ωfb to be described below becomes an angular velocity command ωc to be described below.

That is, the position command Pc is input to the subtractor 513 of the third drive source controller 203, and the position feedback value Pfb to be described below is input from the rotation angle calculator 553. In the rotation angle calculator 553, the number of pulses input from the third angle sensor 413 is counted, and the rotation angle of the third drive source 403 according to the counted value is output to the subtractor 513 as the position feedback value Pfb. The subtractor 513 outputs a deviation (value obtained by subtracting the position feedback value Pfb from a targeted value of the rotation angle of the third drive source 403) between the position command Pc and the position feedback value Pfb to the position controller 523.

The position controller 523 performs predetermined calculation processing using the deviation input from the subtractor 513 and a proportional gain that is a predetermined factor, and calculates the targeted value of the angular velocity of the third drive source 403 according to the deviation. The position controller 523 outputs a signal showing the targeted value (command value) of the angular velocity of the third drive source 403 to the subtractor 533 as the angular velocity command ωc. In addition, in the present embodiment, proportional control (P control) is performed as the feedback control. However, the feedback control is not limited to this.

Additionally, in the angular velocity calculator 563, the angular velocity of the third drive source 403 is calculated on the basis of the frequency of a pulse signal input from the third angle sensor 413, and the angular velocity is output to the subtractor 533 as the angular velocity feedback value ωfb.

The angular velocity command ωc and the angular velocity feedback value ωfb are input to the subtractor 533. The subtractor 533 outputs a deviation (value obtained by subtracting the angular velocity feedback value ωfb from the targeted value of the angular velocity of the third drive source 403) between the angular velocity command ωc and the angular velocity feedback value ωfb to the angular velocity controller 543.

The angular velocity controller 543 performs predetermined calculation processing including integration, using the deviation input from the subtractor 533, a proportional gain that is a predetermined factor, an integration gain, or the like, thereby generating a driving signal (driving current) of the third drive source 403 according to the deviation and supplying the driving signal to the motor 403M via the motor driver 303. In addition, in the present embodiment, the PI control is performed as the feedback control. However, the feedback control is not limited to this.

In this way, the feedback control is performed and the driving current of the third drive source 403 is controlled so that the position feedback value Pfb is as equal to the position command Pc as possible and the angular velocity feedback value ωfb is as equal to the angular velocity command ωc as possible.

In addition, since the drive source controllers 204 to 206 are the same as that of the third drive source controller 203, respectively, the description thereof is omitted.

As described above, according to the robot 1, the vibration in the robot 1 can be easily and reliably suppressed.

First, in the control of the robot 1, a huge calculation is unnecessary, and thereby, the response speed in the control of the robot 1 can be increased, and the configuration of the control device 20 can be simplified.

Additionally, in the control of the robot 1, a calculation in which a singular point is present is unnecessary. Thus, the control of the robot 1 can be reliably performed, and thereby, the vibration can be reliably suppressed.

Additionally, since the control of suppressing vibration is performed on the second drive source 402 that drives the second arm 13, using the detection result of the second (a) inertia sensor 32a installed at the third arm 14 on the tip side where a larger vibration than the second arm 13 is generated, the effect of suppressing the vibration in the robot 1 can be enhanced. Additionally, the effect of suppressing the vibration in the robot 1 can be enhanced by controlling the operation of the second drive source 402 that rotates the second arm 13 closer to the base end side than the third arm 14.

Additionally, since the inertia sensors 31 and 32a are installed at the first arm 12 and the third arm 14, respectively, and the first rotation axis O1 for the rotation of the first arm 12, the second rotation axis O2 for the rotation of the second arm 13, and the third rotation axis O3 for the rotation of the third arm 14 are made orthogonal to each other, the angular velocities of the first arm 12 and the third arm 14 can be detected as simple rotational components in which these velocities are not mixed. Hence, since control is performed by the calculation using these velocities, the vibration in the robot 1 can be more easily, accurately, and reliably suppressed.

In addition, since the first rotation axis O1 for the rotation of the first arm 12, the second rotation axis O2 for the rotation of the second arm 13, and the third rotation axis O3 for the rotation of the third arm 14 are made orthogonal to each other, the angular velocities of the first arm 12 and the third arm 14 can be detected as simple rotational components in which these velocities are not mixed. Since the rotational components with no mixture of these velocities are multiplied by feedback gains, respectively, the respective rotational components can be corrected with high precision.

Second Embodiment

Figure 11:
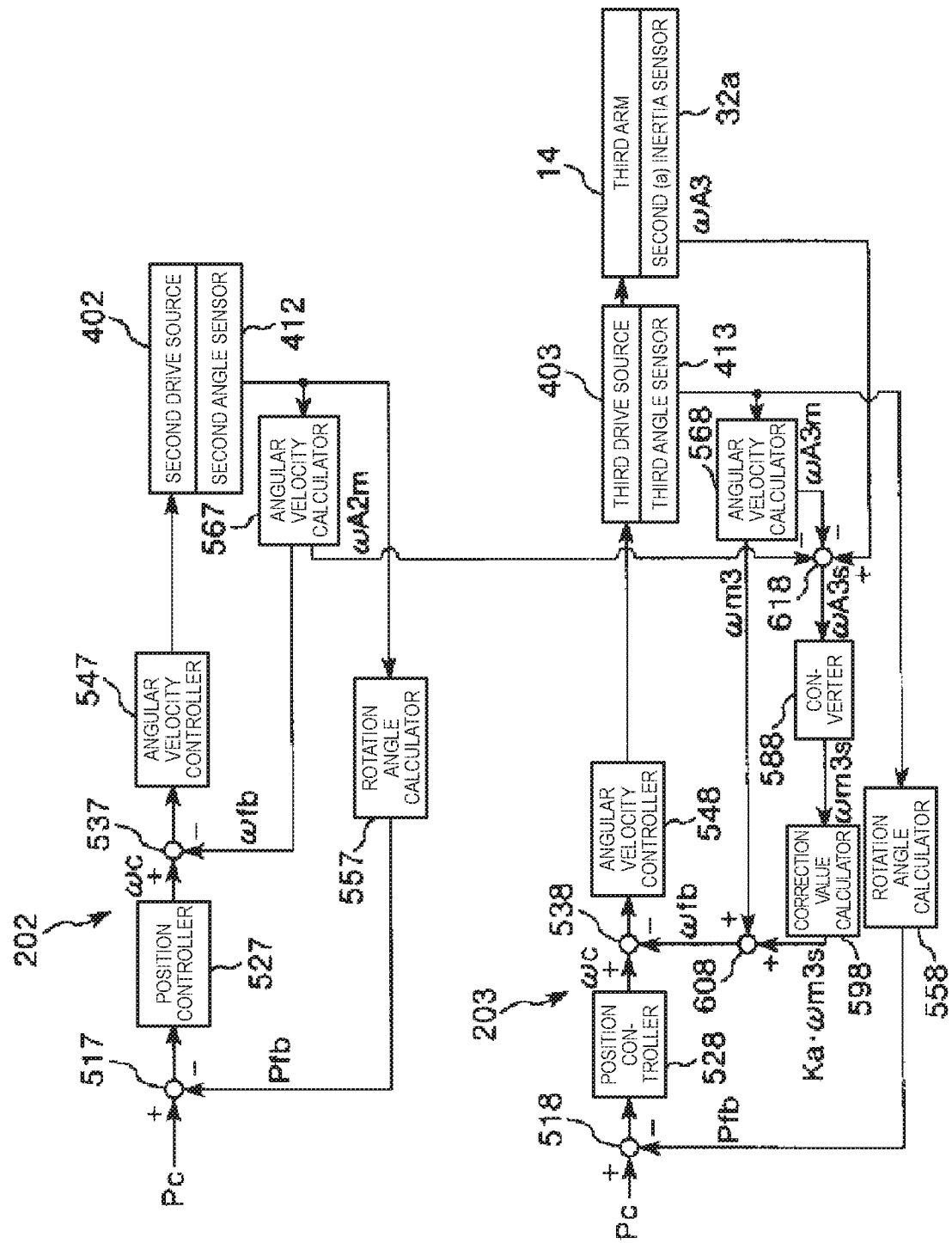
FIG. 11 is a block diagram showing portions of a second embodiment of a robot.

FIG. 11 is a block diagram showing main portions of a second embodiment of a robot.

The second embodiment will be described below mainly, regarding the differences from the aforementioned first embodiment, and the description of the same matters will be omitted.

As shown in FIG. 11, in the robot 1 of the second embodiment, the second drive source controller 202 and the third drive source controller 203 of the control device 20 are different from those of the first embodiment, respectively. That is, in the robot 1, the operation of the first drive source 401 and the third drive source 403 is controlled on the basis of the detection results of the first inertia sensor 31 and the second (a) inertia sensor 32a. The second drive source controller 202 and the third drive source controller 203 will be described below.

As shown in FIG. 11, the second drive source controller 202 has a subtractor 517, a position controller 527, a subtractor 537, an angular velocity controller 547, a rotation angle calculator 557, and an angular velocity calculator 567.

Additionally, the third drive source controller 203 has a subtractor 518, a position controller 528, a subtractor 538, an angular velocity controller 548, a rotation angle calculator 558, an angular velocity calculator 568, an adder-subtractor 618, a converter 588, a correction value calculator 598, and an adder 608.

As shown in FIG. 11, in addition to a position command Pc of the second drive source 402, a detection signal is input from the second angle sensor 412 to the second drive source controller 202. The second drive source controller 202 drives the second drive source 402 by feedback control using the respective detection signals so that a rotation angle (position feedback value Pfb) of the second drive source 402 calculated from the detection signal of the second angle sensor 412 becomes the position command Pc and an angular velocity feedback value ωfb to be described below becomes an angular velocity command ωc to be described below.

That is, the position command Pc is input to the subtractor 517 of the second drive source controller 202, and the position feedback value Pfb to be described below is input from the rotation angle calculator 557. In the rotation angle calculator 557, the number of pulses input from the second angle sensor 412 is counted, and the rotation angle of the second drive source 402 according to the counted value is output to the subtractor 517 as the position feedback value Pfb. The subtractor 517 outputs a deviation (value obtained by subtracting the position feedback value Pfb from a targeted value of the rotation angle of the second drive source 402) between the position command Pc and the position feedback value Pfb to the position controller 527.

The position controller 527 performs predetermined calculation processing using the deviation input from the subtractor 517 and a proportional gain that is a predetermined factor, and calculates the targeted value of the angular velocity of the second drive source 402 according to the deviation. The position controller 527 outputs a signal showing the targeted value (command value) of the angular velocity of the second drive source 402 to the subtractor 537 as the angular velocity command ωc. In addition, in the present embodiment, proportional control (P control) is performed as the feedback control. However, the feedback control is not limited to this.

Additionally, in the angular velocity calculator 567, the angular velocity of the second drive source 402 is calculated on the basis of the frequency of a pulse signal input from the second angle sensor 412, and the angular velocity is output to the subtractor 537 as the angular velocity feedback value ωfb.

The angular velocity command ωc and the angular velocity feedback value ωfb are input to the subtractor 537. The subtractor 537 outputs a deviation (value obtained by subtracting the angular velocity feedback value ωfb from the targeted value of the angular velocity of the second drive source 402) between the angular velocity command ωc and the angular velocity feedback value ωfb to the angular velocity controller 547.

The angular velocity controller 547 performs predetermined calculation processing including integration, using the deviation input from the subtractor 537, a proportional gain that is a predetermined factor, an integration gain, or the like, thereby generating a driving signal (driving current) of the second drive source 402 according to the deviation and supplying the driving signal to the motor 402M via the motor driver 302. In addition, in the present embodiment, the PI control is performed as the feedback control. However, the feedback control is not limited to this.

In this way, the feedback control is performed and the driving current of the second drive source 402 is controlled so that the position feedback value Pfb is as equal to the position command Pc as possible and the angular velocity feedback value ωfb is as equal to the angular velocity command ωc as possible.

In addition to a position command Pc of the third drive source 403, detection signals are input from the third angle sensor 413 and the second (a) inertia sensor 32a, respectively, to the third drive source controller 203. The third drive source controller 203 drives the third drive source 403 by feedback control using the respective detection signals so that a rotation angle (position feedback value Pfb) of the third drive source 403 calculated from the detection signal of the third angle sensor 413 becomes the position command Pc and an angular velocity feedback value ωfb to be described below becomes an angular velocity command ωc.

That is, the position command Pc is input to the subtractor 518 of the third drive source controller 203, and the position feedback value Pfb to be described below is input from the rotation angle calculator 558. In the rotation angle calculator 558, the number of pulses input from the third angle sensor 413 is counted, and the rotation angle of the third drive source 403 according to the counted value is output to the subtractor 518 as the position feedback value Pfb. The subtractor 518 outputs a deviation (value obtained by subtracting the position feedback value Pfb from a targeted value of the rotation angle of the third drive source 403) between the position command Pc and the position feedback value Pfb to the position controller 528.

The position controller 528 performs predetermined calculation processing using the deviation input from the subtractor 518 and a proportional gain that is a predetermined factor, and calculates the targeted value of the angular velocity of the third drive source 403 according to the deviation. The position controller 528 outputs a signal showing the targeted value (command value) of the angular velocity of the third drive source 403 to the subtractor 538 as the angular velocity command (third angular velocity command) ωc. In addition, in the present embodiment, proportional control (P control) is performed as the feedback control. However, the feedback control is not limited to this.

The angular velocity command ωc and the angular velocity feedback value ωfb to be described below are input to the subtractor 538. The subtractor 538 outputs a deviation (value obtained by subtracting the angular velocity feedback value ωfb from the targeted value of the angular velocity of the third drive source 403) between the angular velocity command ωc and the angular velocity feedback value ωfb to the angular velocity controller 548.

The angular velocity controller 548 performs predetermined calculation processing including integration, using the deviation input from the subtractor 538, a proportional gain that is a predetermined factor, an integration gain, or the like, thereby generating a driving signal (driving current) of the third drive source 403 according to the deviation and supplying the driving signal to the motor 403M of the third drive source 403 via the motor driver 303. In addition, in the present embodiment, the PI control is performed as the feedback control. However, the feedback control is not limited to this.

In this way, the feedback control is performed and the driving current of the third drive source 403 is controlled so that the position feedback value Pfb is as equal to the position command Pc as possible and the angular velocity feedback value ωfb is as equal to the angular velocity command ωc as possible. In addition, since the rotation axis O3 is orthogonal to the rotation axis O1, the rotation axis is not influenced by the operation or vibration of the first arm 12, and the operation of the third drive source 403 can be controlled independently from the first drive source 401.

Next, the angular velocity feedback value ωfb in the third drive source controller 203 will be described.

In the angular velocity calculator 568, an angular velocity ωm3 of the third drive source 403 is calculated on the basis of the frequency of a pulse signal input from the third angle sensor 413, and the angular velocity ωm3 is output to the adder 608.

Additionally, in the angular velocity calculator 568, an angular velocity ωA3m of the third arm 14 around the rotation axis O3 is calculated on the basis of the frequency of the pulse signal input from the third angle sensor 413, and the angular velocity ωA3m is output to the adder-subtractor 618. In addition, the angular velocity ωA3m is a value obtained by dividing the angular velocity ωm3 by a reduction ratio between the motor 403M of the third drive source 403 and the third arm 14, that is, in the joint 173.

Additionally, the angular velocity of the third arm 14 around the rotation axis O2 is detected by the second (a) inertia sensor 32a. A detection signal of the second (a) inertia sensor 32a, that is, an angular velocity ωA3 of the third arm 14 around the rotation axis O2 detected by the second (a) inertia sensor 32a is output to the adder-subtractor 618. In addition, since the rotation axes O2 and O3 are orthogonal to the rotation axis O1, respectively, the angular velocity of the third arm 14 around the rotation axis O2 can be easily and reliably obtained without being influenced by the operation or vibration of the first arm 12.

The angular velocity ωA3, the angular velocity ωA2m, and the angular velocity ωA3m are input to the adder-subtractor 618, and the adder-subtractor 618 outputs a value ωA3s (=ωA3−ωA2m−ωA3m) obtained by subtracting the angular velocity ωA2m and the angular velocity ωA3m from the angular velocity ωA3 to the converter 588. The value ωA3s is equivalent to a vibration component (vibration angular velocity) of the total angular velocity of the arm 13 and the arm 14 around the rotation axis O2. Hereinafter, ωA3s is referred to as a vibration angular velocity. In the present embodiment, feedback control is performed in which the vibration angular velocity ωA3s (in detail, an angular velocity (m3s in the motor 403M that is a value generated on the basis of the vibration angular velocity ωA3s) is multiplied by a gain Ka to be described below and is returned to the input side of the third drive source 403. Specifically, feedback control is performed on the third drive source 403 so that the vibration angular velocity ωA3s becomes as close to 0 as possible. Accordingly, the vibration in the robot 1 can be suppressed. In addition, the angular velocity of the third drive source 403 is controlled in the feedback control.

The converter 588 converts the vibration angular velocity ωA3s into the angular velocity ωm3s in the third drive source 403, and outputs the angular velocity ωm3s to the correction value calculator 598. This conversion can be obtained by multiplying the vibration angular velocity ωA3s by the reduction ratio between the motor 403M of the third drive source 403 and the third arm 14, that is, in the joint 173.

The correction value calculator 598 multiplies the angular velocity ωm3s by a gain (feedback gain) Ka that is a predetermined factor, obtains a correction value (third correction component) Ka·ωm3s, and outputs the correction value Ka·ωm3s to the adder 608. In addition, the gain Ka in the third drive source controller 203 and the gain Ka in the first drive source controller 201 may be the same or may be different.

The angular velocity ωm3 and the correction value Ka·ωm3s are input to the adder 608. The adder 608 outputs an additional value of the angular velocity ωm3 and the correction value Ka·ωm3s to the subtractor 538 as the angular velocity feedback value ωfb. In addition, the subsequent operation is the same as that of the first embodiment.

According to the robot 1, the same effects as the aforementioned first embodiment are obtained.

Third Embodiment

Figure 12:
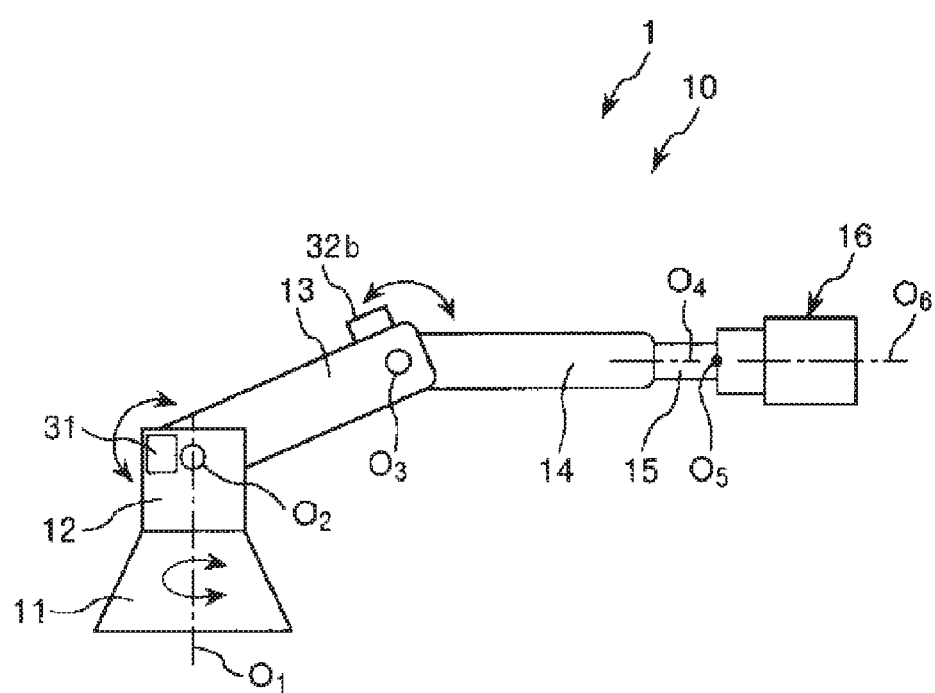
FIG. 12 is a schematic view showing a third embodiment of a robot.
Figure 13:
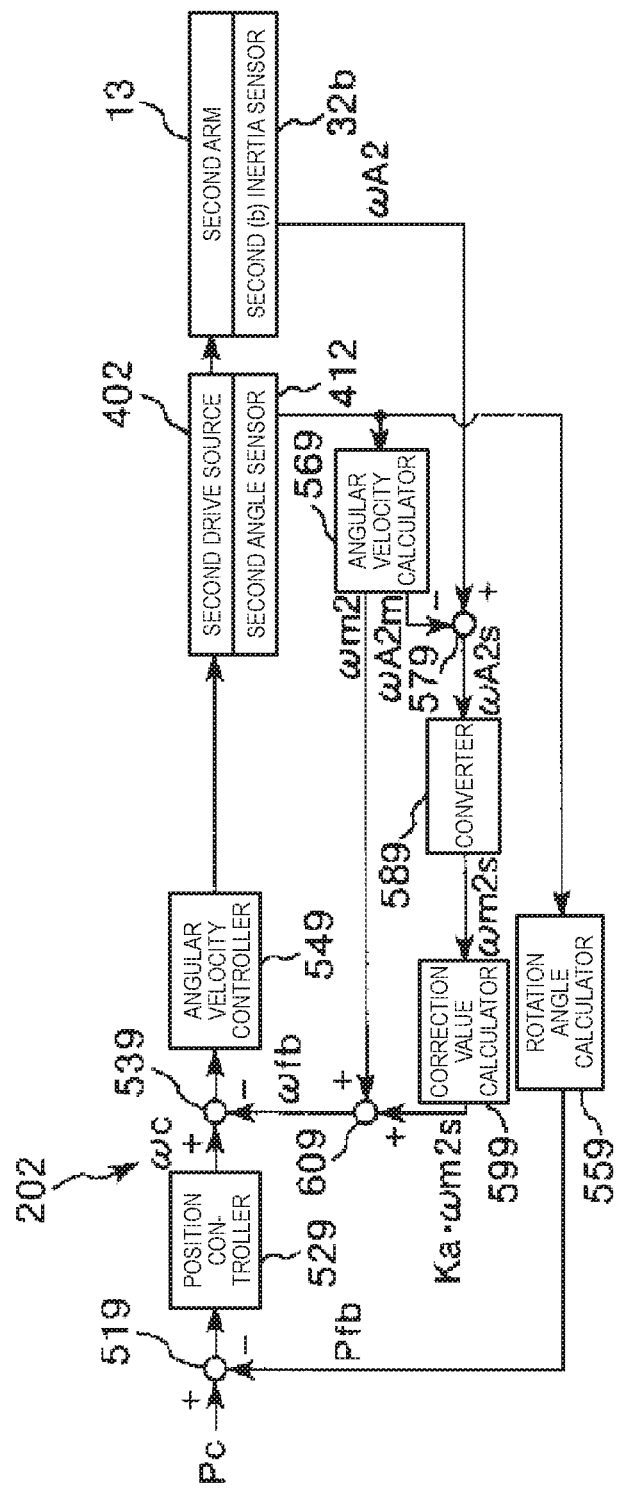
FIG. 13 is a block diagram of portions of the robot shown in FIG. 12.
Figure 14:
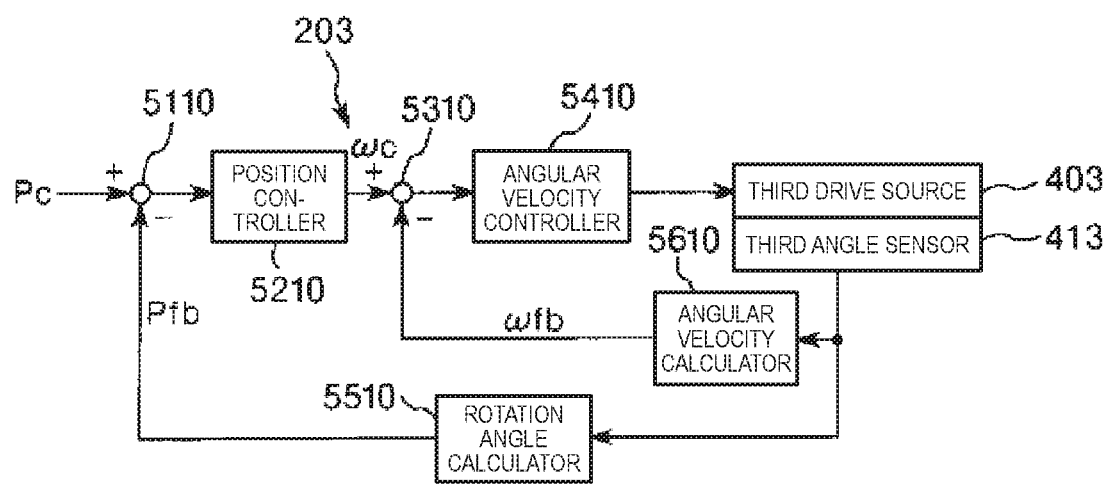
FIG. 14 is a block diagram showing portions of the third embodiment of the robot.

FIG. 12 is a schematic view showing a third embodiment of a robot. FIGS. 13 and 14 are block diagrams of main portions of the robot shown in FIG. 12, respectively.

In addition, in the following, for convenience of description, the upper side in FIG. 12 is referred to as "upper" and "upside" and the lower side is referred to as "lower" and "downside". Additionally, the base side in FIG. 12 is referred to as a "base end", and the opposite side is referred to as a "tip". Additionally, the rotation axes O2 and O3 are shown in an exaggerated manner in FIG. 12, respectively. Additionally, inertia sensors 31 and 32b are shown outside arms 12 and 13 in FIG. 12, respectively, in order to clarify the presence of the sensors.

The third embodiment will be described below, mainly regarding the differences from the aforementioned first embodiment, and the description of the same matters will be omitted.

As shown in FIG. 12, in the robot 1 of the third embodiment, the second (b) inertia sensor 32b is installed at the second arm 13 instead of the third arm 14. The second (b) inertia sensor 32b detects the angular velocity of the second arm 13 around the rotation axis O2. Although the installation position of the second (b) inertia sensor 32b at the second arm 13 is not particularly limited, a tip portion of the second arm 13 is preferable. In the present embodiment, the second (b) inertia sensor 32b is installed at the tip portion inside the second arm 13. Since the vibration in the second arm 13 is maximized at the tip portion of the second arm, this can more reliably suppress the vibration in the robot 1. In addition, it should be understood that the second (b) inertia sensor 32b may be installed at a base end portion of the second arm 13.

Additionally, the second (b) inertia sensor 32b is not particularly limited, and in the present embodiment, for example, a gyroscope sensor or the like can be used.

As shown in FIGS. 13 and 14, in the robot 1, the second drive source controller 202 and the third drive source controller 203 of the control device 20 are different from those of the first embodiment, respectively. That is, in the robot 1, the operation of the first drive source 401 and the second drive source 402 is controlled on the basis of the detection results of the first inertia sensor 31 and the second (b) inertia sensor 32b. The second drive source controller 202 and the third drive source controller 203 will be described below.

As shown in FIG. 13, the second drive source controller 202 has a subtractor 519, a position controller 529, a subtractor 539, an angular velocity controller 549, a rotation angle calculator 559, an angular velocity calculator 569, a subtractor 579, a converter 589, a correction value calculator 599, and an adder 609.

As shown in FIG. 14, the third drive source controller 203 has a subtractor 5110, a position controller 5210, a subtractor 5310, an angular velocity controller 5410, a rotation angle calculator 5510, and an angular velocity calculator 5610.

As shown in FIG. 13, in addition to a position command Pc of the second drive source 402, detection signals are input from the second angle sensor 412 and the second (b) inertia sensor 32b, respectively, to the second drive source controller 202. The second drive source controller 202 drives the second drive source 402 by feedback control using the respective detection signals so that a rotation angle (position feedback value Pfb) of the second drive source calculated from the detection signal of the second angle sensor 412 becomes the position command Pc and an angular velocity feedback value ωfb to be described below becomes an angular velocity command ωc.

That is, the position command Pc is input to the subtractor 519 of the second drive source controller 202, and the position feedback value Pfb to be described below is input from the rotation angle calculator 559. In the rotation angle calculator 559, the number of pulses input from the second angle sensor 412 is counted, and the rotation angle of the second drive source 402 according to the counted value is output to the subtractor 519 as the position feedback value Pfb. The subtractor 519 outputs a deviation (value obtained by subtracting the position feedback value Pfb from a targeted value of the rotation angle of the second drive source 402) between the position command Pc and the position feedback value Pfb to the position controller 529.

The position controller 529 performs predetermined calculation processing using the deviation input from the subtractor 519 and a proportional gain that is a predetermined factor, and calculates the targeted value of the angular velocity of the second drive source 402 according to the deviation. The position controller 529 outputs a signal showing the targeted value (command value) of the angular velocity of the second drive source 402 to the subtractor 539 as the angular velocity command (second angular velocity command) ωc. In addition, in the present embodiment, proportional control (P control) is performed as the feedback control. However, the feedback control is not limited to this.

The angular velocity command ωc and the angular velocity feedback value ωfb to be described below are input to the subtractor 539. The subtractor 539 outputs a deviation (value obtained by subtracting the angular velocity feedback value ωfb from the targeted value of the angular velocity of the second drive source 402) between the angular velocity command ωc and the angular velocity feedback value ωfb to the angular velocity controller 549.

The angular velocity controller 549 performs predetermined calculation processing including integration, using the deviation input from the subtractor 539, a proportional gain that is a predetermined factor, an integration gain, or the like, thereby generating a driving signal (driving current) of the second drive source 402 according to the deviation and supplying the driving signal to the motor 402M via the motor driver 302. In addition, in the present embodiment, the PI control is performed as the feedback control. However, the feedback control is not limited to this.

In this way, the feedback control is performed and the driving current of the second drive source 402 is controlled so that the position feedback value Pfb is as equal to the position command Pc as possible and the angular velocity feedback value ωfb is as equal to the angular velocity command ωc as possible. In addition, since the rotation axis O2 is orthogonal to the rotation axis O1, the rotation axis O2 is not influenced by the operation or vibration of the first arm 12, and the operation of the second drive source can be controlled independently from the first drive source 401.

Next, the angular velocity feedback value ωfb in the second drive source controller 202 will be described.

In the angular velocity calculator 569, an angular velocity ωm2 of the second drive source 402 is calculated on the basis of the frequency of a pulse signal input from the second angle sensor 412, and the angular velocity ωm2 is output to the adder 609.

Additionally, in the angular velocity calculator 569, an angular velocity ωA2m of the second arm 13 around the rotation axis O2 is calculated on the basis of the frequency of the pulse signal input from the second angle sensor 412, and the angular velocity ωA2m is output to the subtractor 579. In addition, the angular velocity ωA2m is a value obtained by dividing the angular velocity ωm2 by a reduction ratio between the motor 402M of the second drive source 402 and the second arm 13, that is, in the joint 172.

Additionally, the second (b) inertia sensor 32b detects the angular velocity of the second arm 13 around the rotation axis O2. A detection signal of the second (b) inertia sensor 32b, that is, an angular velocity ωA2 of the second arm 13 around the rotation axis O2 detected by the second (b) inertia sensor 32b is output to the subtractor 579. In addition, since the rotation axis O2 is orthogonal to the rotation axis O1, the angular velocity of the second arm 13 around the rotation axis O2 can be easily and reliably obtained without being influenced by the operation or vibration of the first arm 12.

The angular velocity ωA2 and the angular velocity ωA2m are input to the subtractor 579, and the subtractor 579 outputs a value ωA2s (=ωA2−ωA2m) obtained by subtracting the angular velocity ωA2m from the angular velocity ωA2 to the converter 589. The value ωA2s is equivalent to a vibration component (vibration angular velocity) of the angular velocity of the second arm 13 around the rotation axis O2. Hereinafter, ωA2s is referred to as a vibration angular velocity. In the present embodiment, feedback control is performed in which the vibration angular velocity ωA2s (in detail, an angular velocity ωm2s in the motor 402M that is a value generated on the basis of the vibration angular velocity ωA2s) is multiplied by a gain Ka to be described below and is returned to the input side of the drive source 402. Specifically, feedback control is performed on the drive source 402 so that the vibration angular velocity ωA2s becomes as close to 0 as possible. Accordingly, the vibration in the robot 1 can be suppressed. In addition, the angular velocity of the drive source 402 is controlled in the feedback control.

The converter 589 converts the vibration angular velocity ωA2s into the angular velocity ωm2s in the second drive source 402, and outputs the angular velocity ωm2s to the correction value calculator 599. This conversion can be obtained by multiplying the vibration angular velocity ωA2s by the reduction ratio between the motor 402M of the second drive source 402 and the second arm 13, that is, in the joint 171.

The correction value calculator 599 multiplies the angular velocity ωm2s by a gain (feedback gain) Ka that is a predetermined factor, obtains a correction value (second correction component) Ka·ωm2s, and outputs the correction value Ka·ωm2s to the adder 609.

The angular velocity ωm2 and the correction value Ka·ωm2s are input to the adder 609. The adder 609 outputs an additional value of the angular velocity ωm2 and the correction value Ka·ωm2s to the subtractor 539 as the angular velocity feedback value ωfb. In addition, the subsequent operation is the same as that of the first embodiment.

As shown in FIG. 14, in addition to a position command Pc of the third drive source 403, a detection signal is input from the third angle sensor 413 to the third drive source controller 203. The third drive source controller 203 drives the third drive source 403 by feedback control using the respective detection signals so that a rotation angle (position feedback value Pfb) of the third drive source 403 calculated from the detection signal of the third angle sensor 413 becomes the position command Pc and an angular velocity feedback value ωfb to be described below becomes an angular velocity command ωc.

That is, the position command Pc is input to the subtractor 5110 of the third drive source controller 203, and the position feedback value Pfb to be described below is input from the rotation angle calculator 5510. In the rotation angle calculator 5510, the number of pulses input from the third angle sensor 413 is counted, and the rotation angle of the third drive source 403 according to the counted value is output to the subtractor 5110 as the position feedback value Pfb. The subtractor 5110 outputs a deviation (value obtained by subtracting the position feedback value Pfb from a targeted value of the rotation angle of the third drive source 403) between the position command Pc and the position feedback value Pfb to the position controller 5210.

The position controller 5210 performs predetermined calculation processing using the deviation input from the subtractor 5110 and a proportional gain that is a predetermined factor, and calculates the targeted value of the angular velocity of the third drive source 403 according to the deviation. The position controller 5210 outputs a signal showing the targeted value (command value) of the angular velocity of the third drive source 403 to the subtractor 5310 as the angular velocity command ωc. In addition, in the present embodiment, proportional control (P control) is performed as the feedback control. However, the feedback control is not limited to this.

Additionally, in the angular velocity calculator 5610, the angular velocity of the third drive source 403 is calculated on the basis of the frequency of a pulse signal input from the third angle sensor 413, and the angular velocity is output to the subtractor 5310 as the angular velocity feedback value ωfb.

The angular velocity command ωc and the angular velocity feedback value ωfb are input to the subtractor 5310. The subtractor 5310 outputs a deviation (value obtained by subtracting the angular velocity feedback value ωfb from the targeted value of the angular velocity of the third drive source 403) between the angular velocity command ωc and the angular velocity feedback value ωfb to the angular velocity controller 5410.

The angular velocity controller 5410 performs predetermined calculation processing including integration, using the deviation input from the subtractor 5310, a proportional gain that is a predetermined factor, an integration gain, or the like, thereby generating a driving signal (driving current) of the third drive source 403 according to the deviation and supplying the driving signal to the motor 403M via the motor driver 303. In addition, in the present embodiment, the PI control is performed as the feedback control. However, the feedback control is not limited to this.

In this way, the feedback control is performed and the driving current of the third drive source 403 is controlled so that the position feedback value Pfb is as equal to the position command Pc as possible and the angular velocity feedback value ωfb is as equal to the angular velocity command ωc as possible.

According to the robot 1, the same effects as the aforementioned first embodiment are obtained.

Fourth Embodiment

Figure 15:
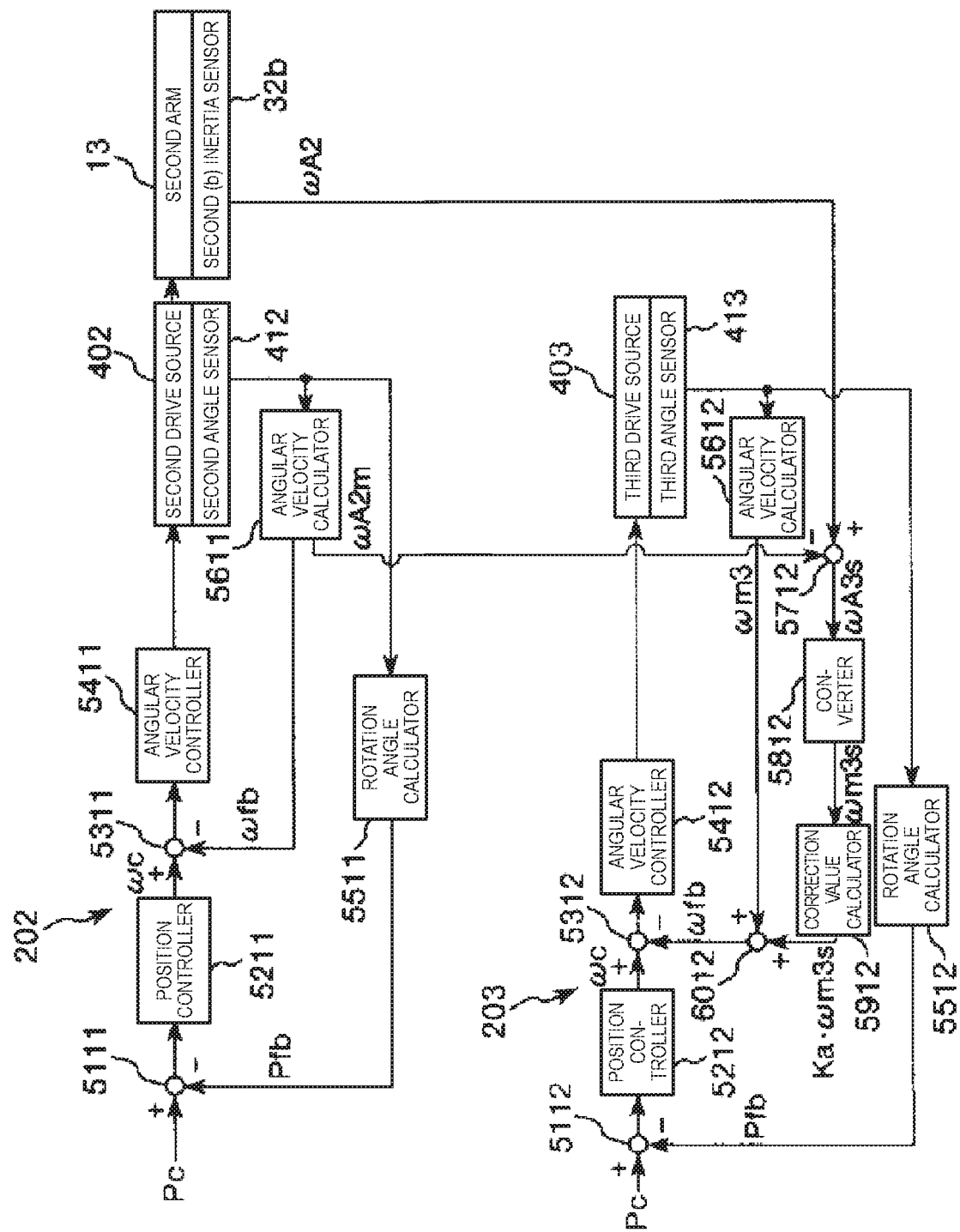
FIG. 15 is a block diagram showing portions of a fourth embodiment of a robot.

FIG. 15 is a block diagram showing main portions of a fourth embodiment of a robot.

The fourth embodiment will be described below, mainly regarding the differences from the aforementioned third embodiment, and the description of the same matters will be omitted.

As shown in FIG. 15, in the robot 1 of the fourth embodiment, the second drive source controller 202 and the third drive source controller 203 of the control device 20 are different from those of the third embodiment, respectively. That is, in the robot 1, the operation of the second drive source 402 and the third drive source 403 is controlled on the basis of the detection results of the first inertia sensor 31 and the second (b) inertia sensor 32b. The second drive source controller 202 and the third drive source controller 203 will be described below.

As shown in FIG. 15, the second drive source controller 202 has a subtractor 5111, a position controller 5211, a subtractor 5311, an angular velocity controller 5411, a rotation angle calculator 5511, and an angular velocity calculator 5611.

Additionally, the third drive source controller 203 has a subtractor 5112, a position controller 5212, a subtractor 5312, an angular velocity controller 5412, a rotation angle calculator 5512, an angular velocity calculator 5612, a subtractor 5712, a converter 5812, a correction value calculator 5912, and an adder 6012.

As shown in FIG. 15, in addition to a position command Pc of the second drive source 402, a detection signal is input from the second angle sensor 412 to the second drive source controller 202. The second drive source controller 202 drives the second drive source 402 by feedback control using the respective detection signals so that a rotation angle (position feedback value Pfb) of the second drive source 402 calculated from the detection signal of the second angle sensor 412 becomes the position command Pc and an angular velocity feedback value ωfb to be described below becomes an angular velocity command cc.

That is, the position command Pc is input to the subtractor 5111 of the second drive source controller 202, and the position feedback value Pfb to be described below is input from the rotation angle calculator 5511. In the rotation angle calculator 5511, the number of pulses input from the second angle sensor 412 is counted, and the rotation angle of the second drive source 402 according to the counted value is output to the subtractor 5111 as the position feedback value Pfb. The subtractor 5111 outputs a deviation (value obtained by subtracting the position feedback value Pfb from a targeted value of the rotation angle of the second drive source 402) between the position command Pc and the position feedback value Pfb to the position controller 5211.

The position controller 5211 performs predetermined calculation processing using the deviation input from the subtractor 5111 and a proportional gain that is a predetermined factor, and calculates the targeted value of the angular velocity of the second drive source 402 according to the deviation. The position controller 5211 outputs a signal showing the targeted value (command value) of the angular velocity of the second drive source 402 to the subtractor 5311 as the angular velocity command ωc. In addition, in the present embodiment, proportional control (P control) is performed as the feedback control. However, the feedback control is not limited to this.

Additionally, in the angular velocity calculator 5611, the angular velocity of the second drive source 402 is calculated on the basis of the frequency of a pulse signal input from the second angle sensor 412, and the angular velocity is output to the subtractor 5311 as the angular velocity feedback value ωfb.

The angular velocity command ωc and the angular velocity feedback value ωfb are input to the subtractor 5311. The subtractor 5311 outputs a deviation (value obtained by subtracting the angular velocity feedback value ωfb from the targeted value of the angular velocity of the second drive source 402) between the angular velocity command ωc and the angular velocity feedback value ωfb to the angular velocity controller 5411.

The angular velocity controller 5411 performs predetermined calculation processing including integration, using the deviation input from the subtractor 5311, a proportional gain that is a predetermined factor, an integration gain, or the like, thereby generating a driving signal (driving current) of the second drive source 402 according to the deviation and supplying the driving signal to the motor 402M via the motor driver 302. In addition, in the present embodiment, the PI control is performed as the feedback control. However, the feedback control is not limited to this.

In this way, the feedback control is performed and the driving current of the second drive source 402 is controlled so that the position feedback value Pfb is as equal to the position command Pc as possible and the angular velocity feedback value ωfb is as equal to the angular velocity command ωc as possible.

In addition to a position command Pc of the third drive source 403, detection signals are input from the third angle sensor 413 and the second (b) inertia sensor 32b, respectively, to the third drive source controller 203. The third drive source controller 203 drives the third drive source 403 by feedback control using the respective detection signals so that a rotation angle (position feedback value Pfb) of the third drive source 403 calculated from the detection signal of the third angle sensor 413 becomes the position command Pc and an angular velocity feedback value ωfb to be described below becomes an angular velocity command ωc.

That is, the position command Pc is input to the subtractor 5112 of the third drive source controller 203, and the position feedback value Pfb to be described below is input from the rotation angle calculator 5512. In the rotation angle calculator 5512, the number of pulses input from the third angle sensor 413 is counted, and the rotation angle of the third drive source 403 according to the counted value is output to the subtractor 5112 as the position feedback value Pfb. The subtractor 5112 outputs a deviation (value obtained by subtracting the position feedback value Pfb from a targeted value of the rotation angle of the third drive source 403) between the position command Pc and the position feedback value Pfb to the position controller 5212.

The position controller 5212 performs predetermined calculation processing using the deviation input from the subtractor 5112, a proportional gain that is a predetermined factor, and the like and calculates the targeted value of the angular velocity of the third drive source 403 according to the deviation. The position controller 5212 outputs a signal showing the targeted value (command value) of the angular velocity of the third drive source 403 to the subtractor 5312 as the angular velocity command (third angular velocity command) ωc. In addition, in the present embodiment, proportional control (P control) is performed as the feedback control. However, the feedback control is not limited to this.

The angular velocity command ωc and the angular velocity feedback value ωfb to be described below are input to the subtractor 5312. The subtractor 5312 outputs a deviation (value obtained by subtracting the angular velocity feedback value ωfb from the targeted value of the angular velocity of the third drive source 403) between the angular velocity command ωc and the angular velocity feedback value ωfb to the angular velocity controller 5412.

The angular velocity controller 5412 performs predetermined calculation processing including integration, using the deviation input from the subtractor 5312, a proportional gain that is a predetermined factor, an integration gain, or the like, thereby generating a driving signal (driving current) of the third drive source 403 according to the deviation and supplying the driving signal to the motor 403M of the third drive source 403 via the motor driver 303. In addition, in the present embodiment, the PI control is performed as the feedback control. However, the feedback control is not limited to this.

In this way, the feedback control is performed and the driving current of the third drive source 403 is controlled so that the position feedback value Pfb is as equal to the position command Pc as possible and the angular velocity feedback value ωfb is as equal to the angular velocity command ωc as possible. In addition, since the rotation axis O3 is orthogonal to the rotation axis O1, the rotation axis is not influenced by the operation or vibration of the first arm 12, and the operation of the third drive source 403 can be controlled independently from the first drive source 401.

Next, the angular velocity feedback value ωfb in the third drive source controller 203 will be described.

In the angular velocity calculator 5612, an angular velocity ωm3 of the third drive source 403 is calculated on the basis of the frequency of a pulse signal input from the third angle sensor 413, and the angular velocity ωm3 is output to the adder 6012.

Additionally, in the angular velocity calculator 5611, an angular velocity ωA2m of the second arm 13 around the rotation axis O2 is calculated on the basis of the frequency of the pulse signal input from the second angle sensor 412, and the angular velocity ωA2m is output to the subtractor 5712. In addition, the angular velocity ωA2m is a value obtained by dividing the angular velocity ωm2 by a reduction ratio between the motor 403M of the second drive source 402 and the second arm 13, that is, in the joint 172.

Additionally, the second (b) inertia sensor 32b detects the angular velocity of the second arm 13 around the rotation axis O2. A detection signal of the second (b) inertia sensor 32b, that is, an angular velocity ωA2 of the second arm 13 around the rotation axis O2 detected by the second (b) inertia sensor 32b is output to the subtractor 5712. In addition, since the rotation axis O2 is orthogonal to the rotation axis O1, the angular velocity of the second arm 13 around the rotation axis O2 can be easily and reliably obtained without being influenced by the operation or vibration of the first arm 12.

The angular velocity ωA2 and the angular velocity ωA2m are input to the subtractor 5712, and the subtractor 5712 outputs a value ωA3s (=ωA2−ωA2m) obtained by subtracting the angular velocity ωA2m from the angular velocity ωA2 to the converter 5812. The value ωA3s is equivalent to a vibration component (vibration angular velocity) of the angular velocity of the arm 13 around the rotation axis O2. Hereinafter, ωA3s is referred to as a vibration angular velocity. In the present embodiment, feedback control is performed in which the vibration angular velocity ωA3s (in detail, an angular velocity ωm3s in the motor 403M that is a value generated on the basis of the vibration angular velocity ωA3s) is multiplied by a gain Ka to be described below and is returned to the input side of the third drive source 403. Specifically, feedback control is performed on the third drive source 403 so that the vibration angular velocity ωA3s becomes as close to 0 as possible. Accordingly, the vibration in the robot 1 can be suppressed. In addition, the angular velocity of the third drive source 403 is controlled in the feedback control.

The converter 5812 converts the vibration angular velocity ωA3s into the angular velocity ωm3s in the third drive source 403, and outputs the angular velocity ωm3s to the correction value calculator 5912. This conversion can be obtained by multiplying the vibration angular velocity ωA3s by the reduction ratio between the motor 403M of the third drive source 403 and the third arm 14, that is, in the joint 173.

The correction value calculator 5912 multiplies the angular velocity ωm3s by a gain (feedback gain) Ka that is a predetermined factor, obtains a correction value (third correction component) Ka·ωm3s, and outputs the correction value Ka·ωm3s to the adder 6012. In addition, the gain Ka in the third drive source controller 203 and the gain Ka in the first drive source controller 201 may be the same or may be different.

The angular velocity ωm3 and the correction value Ka·ωm3s are input to the adder 6012. The adder 6012 outputs an additional value of the angular velocity ωm3 and the correction value Ka·ωm3s to the subtractor 5312 as the angular velocity feedback value ωfb. In addition, the subsequent operation is the same as that of the third embodiment.

According to the robot 1, the same effects as the aforementioned third embodiment are obtained.

Although a robot has been described above on the basis of the illustrated embodiments, the invention is not limited to this, and the configurations of the respective portions can be replaced with arbitrary configurations having the same functions. Additionally, other arbitrary structures may be added to the invention.

Additionally, the invention may be provided by combining two or more arbitrary configurations (features) among the respective embodiments.

In addition, the respective motors include, for example, stepping motors or the like in addition to the servo motors, respectively.

Additionally, in the above embodiments, the encoders are used as the angle sensors, respectively. However, the invention is not limited to these. For example, other various sensors, such as resolvers or potentiometers, which detect the rotation angle of rotors of the motors, may be used, and various sensors, such as tachogenerators, which detect the rotating speed of the rotors of the motors, may be used. In addition, when the stepping motors are used as the motor, the rotation angle or rotating speed of the rotors of the motors may be detected, for example, by measuring the number of driving pulses input to the stepping motors.

Additionally, in the above embodiments, the gyroscope sensors are used as the respective inertia sensors, respectively. However, the invention is not limited to these. For example, other various angular velocity sensors that detect the angular velocity of the arms may be used, and various acceleration sensors that detect the acceleration of the arms may be used. In addition, when the acceleration sensors are used, angular velocity is calculated using the detection values of the acceleration sensors.

Additionally, the types of the respective angle sensors and the respective inertia sensors are not particularly limited, and include, for example, an optical type, a magnetic type, an electromagnetic type, an electric type, or the like.

Additionally, in the above embodiments, the number of rotation axes of the robot is six. However, the invention is not limited to this, and the number of rotation axes of the robot may be three, four, five, or seven or more.

That is, in the above embodiments, the number of arms of the robot is six because the wrist has two arms. However, the invention is not limited to this, and the number of arms of the robot may be three, four, five, or seven or more.

Figure 16:
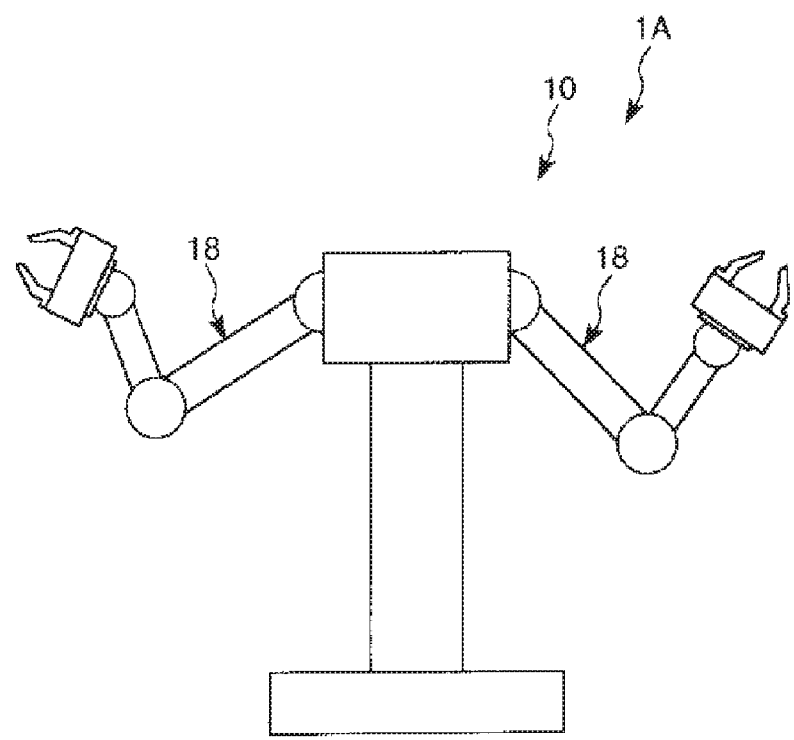
FIG. 16 is a front view showing another configuration example of a robot.

Additionally, in the embodiments, the robot is a single arm robot that has one arm coupling body obtained by rotatably coupling a plurality of arms. However, the invention is not limited to this. For example, as shown in FIG. 16, robots having a plurality of the arm coupling bodies, such as a double-arm robot 1A having the two arm coupling bodies 18 each obtained by rotatably coupling a plurality of arms, may be used.

What is claimed is:

1. A controller controlling a robot including a base, a first arm that is coupled to the base and is rotated around a first rotation axis, a second arm that is rotated around a second rotation axis in a direction different from the first rotation axis, a first inertia sensor that is installed at the first arm, a first drive source that rotates the first arm through a first angular velocity command, and a first angle sensor that detects a rotation angle of the first drive source, comprising:
   a processor that is configured to feed back a first correction component, which is derived from a first angular velocity of the first arm around the first rotation axis obtained from the first inertia sensor and a second angular velocity of the first arm around the first rotation axis obtained from the first angle sensor, and controls the first drive source,
   wherein the first angular velocity is ωA1, which is an angular velocity of the first arm around the first rotation axis,
   the second angular velocity is ωA1m, which is obtained by dividing an angular velocity ωm1 of the first drive source that is calculated on the basis of a frequency of a pulse signal input from the first angle sensor by a reduction ratio between a motor of the first drive source and the first arm, and
   the first correction component is obtained by taking a difference ωA1s between ωA1 and ωA1m, and multiplying the difference ωA1s by a gain Ka that is a predetermined factor.

2. The controller according to claim 1, wherein the processor is configured to control the second arm that is coupled to the first arm based on an output from a second inertia sensor installed at the second arm.

3. The controller according to claim 1, wherein the second arm is coupled to the first arm, and
   the processor is configured to control the second arm based on an output from a third inertia sensor installed at a third arm coupled to the second arm.

4. The controller according to claim 1, wherein the second arm is coupled to the first arm, and
   the processor is configured to control a third arm that is coupled to the second arm based on an output from a third inertia sensor installed at the third arm.

5. The controller according to claim 2, wherein the second arm is coupled to the first arm, and
   the processor is configured to control a third arm that is coupled to the second arm based on an output from a third inertia sensor installed at the third arm.

6. The controller according to claim 1, wherein the first rotation axis is arranged normal to an installation surface of the base.

7. The controller according to claim 2, wherein the first rotation axis is arranged normal to an installation surface of the base.

8. The controller according to claim 3, wherein the first rotation axis is arranged normal to an installation surface of the base.

9. The controller according to claim 4, wherein the first rotation axis is arranged normal to an installation surface of the base.

10. The controller according to claim 5, wherein the first rotation axis is arranged normal to an installation surface of the base.

11. The controller according to claim 1, wherein the first inertia sensor is an angular velocity sensor.

12. The controller according to claim 2, wherein the first inertia sensor is an angular velocity sensor.

13. The controller according to claim 3, wherein the first inertia sensor is an angular velocity sensor.

14. The controller according to claim 4, wherein the first inertia sensor is an angular velocity sensor.

15. The controller according to claim 5, wherein the first inertia sensor is an angular velocity sensor.

16. The controller according to claim 6, wherein the first inertia sensor is an angular velocity sensor.

17. The controller according to claim 7, wherein the first inertia sensor is an angular velocity sensor.

18. The controller according to claim 8, wherein the first inertia sensor is an angular velocity sensor.

19. The controller according to claim 9, wherein the first inertia sensor is an angular velocity sensor.

20. The controller according to claim 10, wherein the first inertia sensor is an angular velocity sensor.

\* \* \* \* \*